(12) United States Patent
Vilbrandt et al.

(10) Patent No.: US 10,107,709 B2
(45) Date of Patent: Oct. 23, 2018

(54) WATER SENSORS WITH MULTI-VALUE OUTPUTS AND ASSOCIATED SYSTEMS AND METHODS

(71) Applicant: Sears Brands, L.L.C., Hoffman Estates, IL (US)

(72) Inventors: Patrick William Vilbrandt, Edmonds, WA (US); Matthew Stephen Reynolds, Seattle, WA (US); Shwetak N. Patel, Seattle, WA (US)

(73) Assignee: SEARS BRANDS, L.L.C., Hoffman Estates, IL (US)

( * ) Notice: Subject to any disclaimer, the term of this patent is extended or adjusted under 35 U.S.C. 154(b) by 0 days.

(21) Appl. No.: 14/933,243

(22) Filed: Nov. 5, 2015

(65) Prior Publication Data

US 2016/0123834 A1 May 5, 2016

Related U.S. Application Data

(60) Provisional application No. 62/075,841, filed on Nov. 5, 2014.

(51) Int. Cl.
*G01M 3/16* (2006.01)
*G01N 27/22* (2006.01)
(Continued)

(52) U.S. Cl.
CPC ............... *G01M 3/18* (2013.01); *F17D 5/06* (2013.01)

(58) Field of Classification Search
CPC ...... G01N 27/22; G01N 27/12; G01N 27/048; G01N 22/04; G01N 27/223; G01N 27/041; G01N 27/046; G01N 27/07; G01N 27/121; G01N 27/225; G01N 27/226; G01N 27/4168; G01N 33/246; G01N 33/0006; G01N 33/0031; G01N 33/0062; G01N 33/01; G01N 33/2888; G01N 25/56; G01M 3/18; G01M 3/181; G01M 3/182; G01M 3/183; G01M 3/184; G01M 3/185; G01M 3/186; G01M 3/187; G01M 3/188; G01M 3/04; G01M 3/045; F17D 5/06; A01G 25/167; A01G 25/16; A61B 5/0531;
(Continued)

(56) References Cited

U.S. PATENT DOCUMENTS 3,766,471 A 10/1973 Pullman
4,513,608 A 4/1985 Cuming
(Continued)

OTHER PUBLICATIONS

International Search Report and Written Opinion for PCT/US2015/59175, dated Mar. 2, 2016, 7 pages.

*Primary Examiner* — Tung X Nguyen
*Assistant Examiner* — Lee Rodak
(74) *Attorney, Agent, or Firm* — McAndrews, Held & Malloy, Ltd.

(57) ABSTRACT

Embodiments of water sensors having multi-value outputs are disclosed. A water sensing circuit measures the impedance between two contacts of a water sensor and compares it with a reference signal. The impedance between two contacts varies depending on the wetness of the contacts, and so the sensing circuit may provide a measured wetness level. The water sensor may transmit measurements or other information wired or wirelessly. The water sensor may display indicia of measurements or other information via a display on a housing.

18 Claims, 13 Drawing Sheets

(51) Int. Cl.
*G01N 27/00* (2006.01)
*G01M 3/18* (2006.01)
*F17D 5/06* (2006.01)

(58) Field of Classification Search
CPC ......... A61B 5/442; A61B 5/01; A61B 5/1477;
A61B 5/441; A61B 5/443; A61B
2562/029; Y10T 137/189; Y10T
137/7306; Y10T 29/49071
USPC ........ 324/76.11, 519, 754.28, 658, 634, 640,
324/643, 664, 689, 694, 663, 665, 695,
324/696; 73/29.01, 73–77, 24.04, 25.04,
73/152.06, 152.08
See application file for complete search history.

(56) References Cited

U.S. PATENT DOCUMENTS

| | | |
|---|---|---|
| 4,965,548 A | 10/1990 | Fayfield |
| 4,966,158 A | 10/1990 | Honma et al. |
| 5,751,071 A | 5/1998 | Netzer |
| 6,526,807 B1 * | 3/2003 | Doumit .................. G01M 3/04 340/605 |
| 6,553,813 B2 | 4/2003 | Rynhart et al. |
| 7,142,123 B1 | 11/2006 | Kates |
| 7,944,220 B2 | 5/2011 | Lock |
| 9,105,175 B1 * | 8/2015 | Cantolino ................ F24H 9/16 |
| 9,222,906 B2 * | 12/2015 | Youssi ................. G01N 27/223 |
| 2003/0062908 A1 * | 4/2003 | Venter .................. G01N 27/223 324/661 |
| 2003/0076120 A1 * | 4/2003 | DeHart .................. G01N 22/04 324/694 |
| 2003/0222662 A1 * | 12/2003 | Geisel ................. G01N 27/045 324/664 |
| 2007/0084722 A1 | 4/2007 | Sagawa et al. |
| 2008/0051643 A1 * | 2/2008 | Park ..................... A61B 5/0531 600/306 |
| 2008/0091345 A1 | 4/2008 | Patel et al. |
| 2010/0109842 A1 | 5/2010 | Patel et al. |
| 2013/0151172 A1 * | 6/2013 | Rao ...................... G01N 27/048 702/50 |
| 2014/0260604 A1 * | 9/2014 | Ranwell ............... G01N 27/048 73/335.01 |
| 2016/0183484 A1 * | 6/2016 | Richings, Sr. ....... G01N 33/246 239/11 |

* cited by examiner

Sensor Transmission Packet

WATER SENSORS WITH MULTI-VALUE OUTPUTS AND ASSOCIATED SYSTEMS AND METHODS

CLAIM OF PRIORITY

This patent application claims priority to and claims benefit from the U.S. Provisional Patent Application Ser. No. 62/075,841, filed on Nov. 5, 2014. The above stated application is hereby incorporated herein by reference in its entirety.

TECHNICAL FIELD

The present disclosure relates generally to water sensors having multi-value outputs and wireless sensor systems and devices. The present disclosure further relates generally to wireless sensor systems and devices, and more particularly, to the use of infrastructure to transduce signals from wireless sensors and devices.

BACKGROUND

Early detection of liquid water is a preemptive way of preventing structural damage to buildings in the event of isolated leaks. However, the presence of large amounts of liquid water will likely have already caused damage before the source of the leak may be stopped and the damage mitigated. Accordingly, there is a need for improved water sensors.

BRIEF DESCRIPTION OF THE DRAWINGS

The various features and advantages of the present technology may be more readily understood with reference to the following detailed description taken in conjunction with the accompanying drawings, wherein like reference numerals designate like structural elements.

DETAILED DESCRIPTION

Figure 1A:
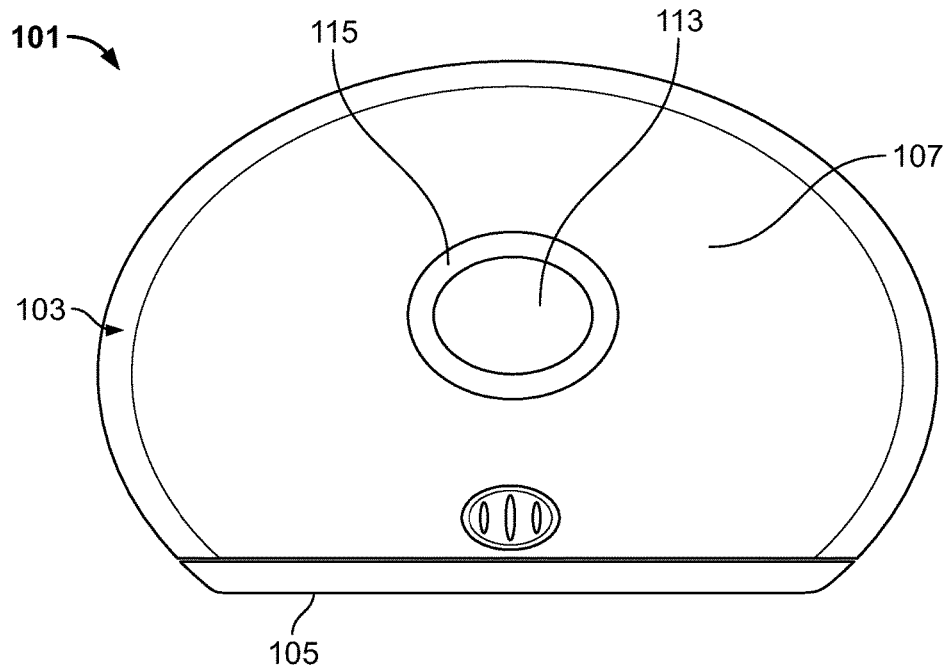
FIG. 1A is a front view of a water sensor.

Remote sensors may be disposed within or around a structure such as a house or other building and may transmit readings to a receiver. One such sensor is a water sensor, which may be used to detect leaks, e.g., before they become a significant problem. As noted above, early detection of liquid water is a preemptive way of preventing structural damage to buildings in the event of isolated leaks. However, by the time a leak is detected, the presence of large amounts of liquid water will likely have already caused damage. Embodiments of the water sensors disclosed herein may detect a range of wetness between that of a dry, non-conductive surface and the same surface covered with liquid water. This allows, e.g., through analysis of the electrical impedance at two or more sensing contacts, detecting a water leak before significant damage has occurred. Analysis of an electrical impedance at two or more sensing contacts, alone or in combination with temperature data may also be used to mathematically model the likely rate of mold growth in nearby areas over a given timeframe.

A representative water sensing circuit provides the benefit of sensing multiple wetness values, e.g., over a range of wetness conditions, in contrast to a binary sensor which may only output one of two conditions (e.g., "dry" or "wet"). Furthermore, many existing water sensors are passive, resistance-based sensors which do not work with water containing varying amounts of dissolved substances. Water leaks may involve water having any of a wide range of purity values, ranging from nearly pure water to very dirty water containing a high fraction of dissolved substances. For example, the pH of the water, the presence of soap in the water, and/or other conditions may affect the resistance of the water, and accordingly the operation of a resistance-based water sensor.

By contrast, embodiments of the water sensing circuit disclosed herein may output a range of "wetness", or wetness values, or parameters correlated with wetness, and accordingly varying thresholds may be set to determine an alarm and/or other condition. This feature may allow detection of different degrees of water purity. For example, if the water sensor is configured to be placed below a washing machine, a different threshold may be set compared to a water sensor that is configured to be placed in an attic. In some embodiments, the threshold may be tuned prior to deploying the water sensor. In some embodiments, the water sensor(s) may be tuned by the customer after purchase, depending on the intended placement and/or other parameters.

In particular embodiments, the measurements permit the sensor to differentiate between a hand being placed over the sensing elements (e.g., one or more contacts) and the presence of water over the contacts, thereby reducing false positives during placement of the water sensor. For example, the sensing circuit may operate as a galvanic skin sensor, with different levels of skin conductivity producing a different output and/or a different characteristic waveform. These outputs may be different than the output associated with liquid water. The different outputs may be used to determine whether a person's skin (as opposed to water) is touching the contacts. By differentiating between a person's touch and water, the system may reduce false positives.

Figure 1B:
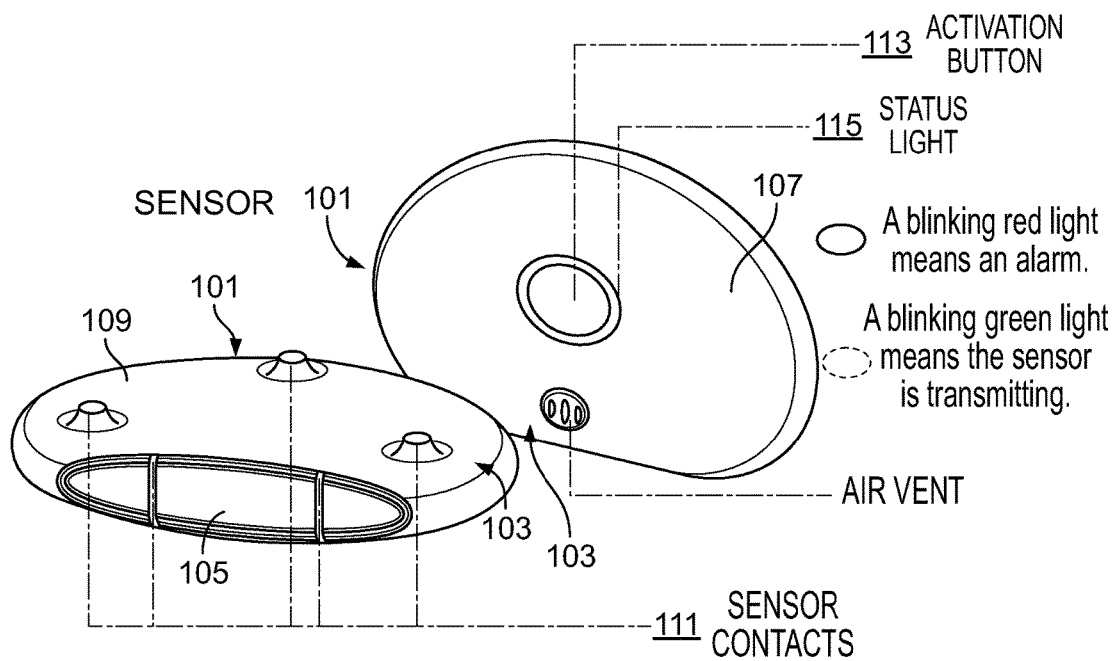
FIG. 1B illustrates perspective side and bottom views of the water sensor shown in FIG. 1A.

FIG. 1A is a front view of a water sensor. FIG. 1B shows perspective side and bottom views of the water sensor. Referring to FIGS. 1A-B together, the water sensor 101 comprises a housing 103 having a bottom surface 105, a front surface 107 and a rear surface 109. A plurality of sensor contacts 111 are disposed both on the bottom surface 105 and on the rear surface 109. Some of the contacts 111 may also be screws or other fasteners configured for fastening the housing 103. The front surface 107 of the housing 103 comprises an activation button 113 and a display 115 such as an annular status light surrounding the activation button 113. The display or status light 115 may provide indicia of the status of the sensor (i.e., functioning, powered on, etc.), and/or indicia of the measured water level (e.g., alarm condition upon measuring a predetermined threshold wetness value, etc.).

In use, the water sensor 101 may be disposed so that either the bottom surface 105 or the rear surface 109 is facing the surface to be measured for wetness. The sensor contacts 111 may be conductive elements that extend beyond the housing 103. As described in more detail below, a water sensing circuit disposed within the housing 103 may measure the wetness of the contacts 111.

Figure 2:
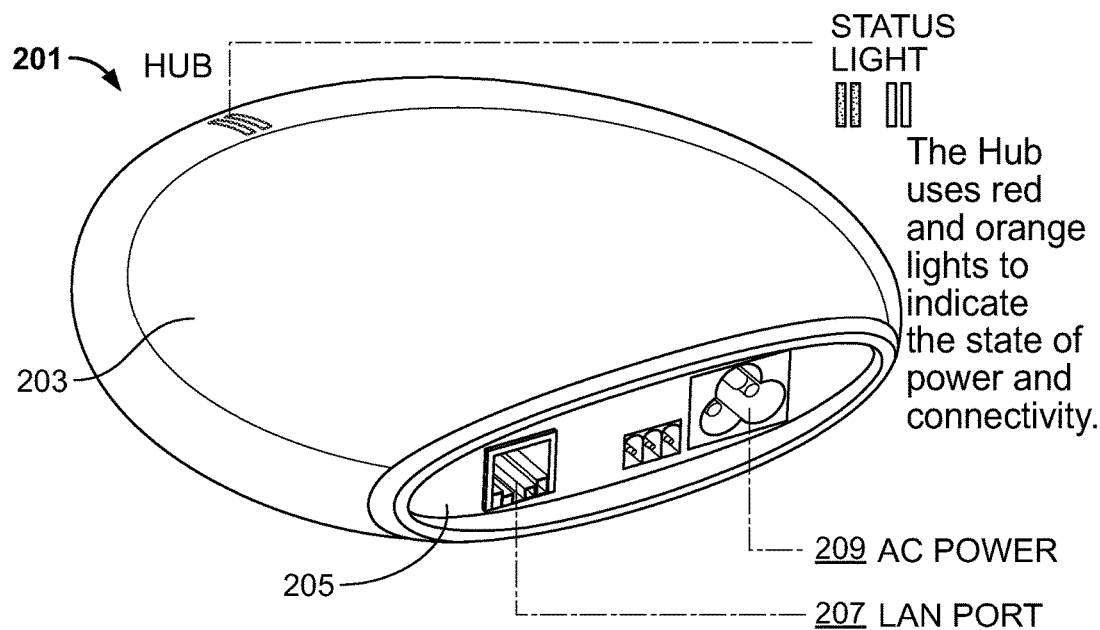
FIG. 2 illustrates a perspective view of a hub.

The water sensor 101 may be configured to transmit signals to a hub 201, as shown in FIG. 2. The hub 201 may include a housing 203 and a rear surface 205 housing an I/O port 207 (e.g., LAN) and a power plug 209. The hub 201 may be configured to receive signals from the water sensor 101, and/or to transmit signals to the water sensor 101. In some embodiments, a single hub 201 may communicate with a number of water sensors 101 that may be distributed in various locations within a structure.

Figure 3:
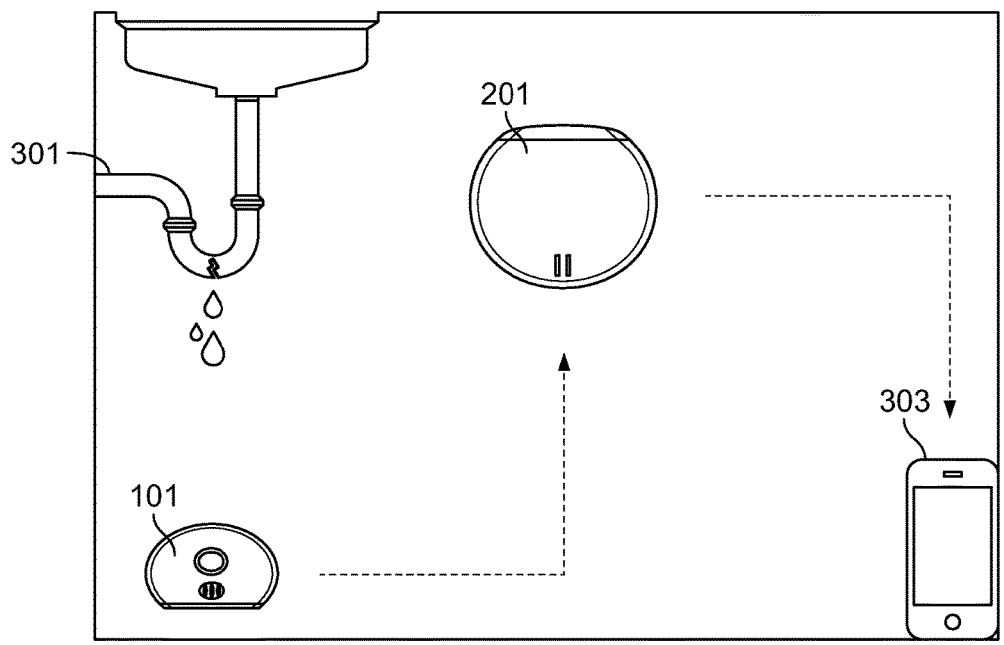
FIG. 3 schematically illustrates a water monitoring system.

FIG. 3 schematically illustrates a water monitoring system in which the water sensor 101 is placed beneath a sink's piping 301. The water sensor 101 may detect the presence of water, indicating a leak from the piping 301. The water sensor 101 may communicate with the hub 201. This communication may be wired or wireless. For wireless communication, the sensor 101 may utilize standard protocols such as WiFi, NFC, Bluetooth, etc. In some embodiments, the sensor 101 may communicate with the hub 201 by coupling a transmitted signal with existing infrastructure in a building, such as the existing power line. Examples of such a wireless communication network are disclosed below with respect to FIGS. 6-14. In some embodiments, the hub 201 may be connected to a device 303 such as a smartphone, laptop, etc. In some embodiments, the hub 201 may be internet-connected so as to communicate with remote devices 303.

Figure 4:
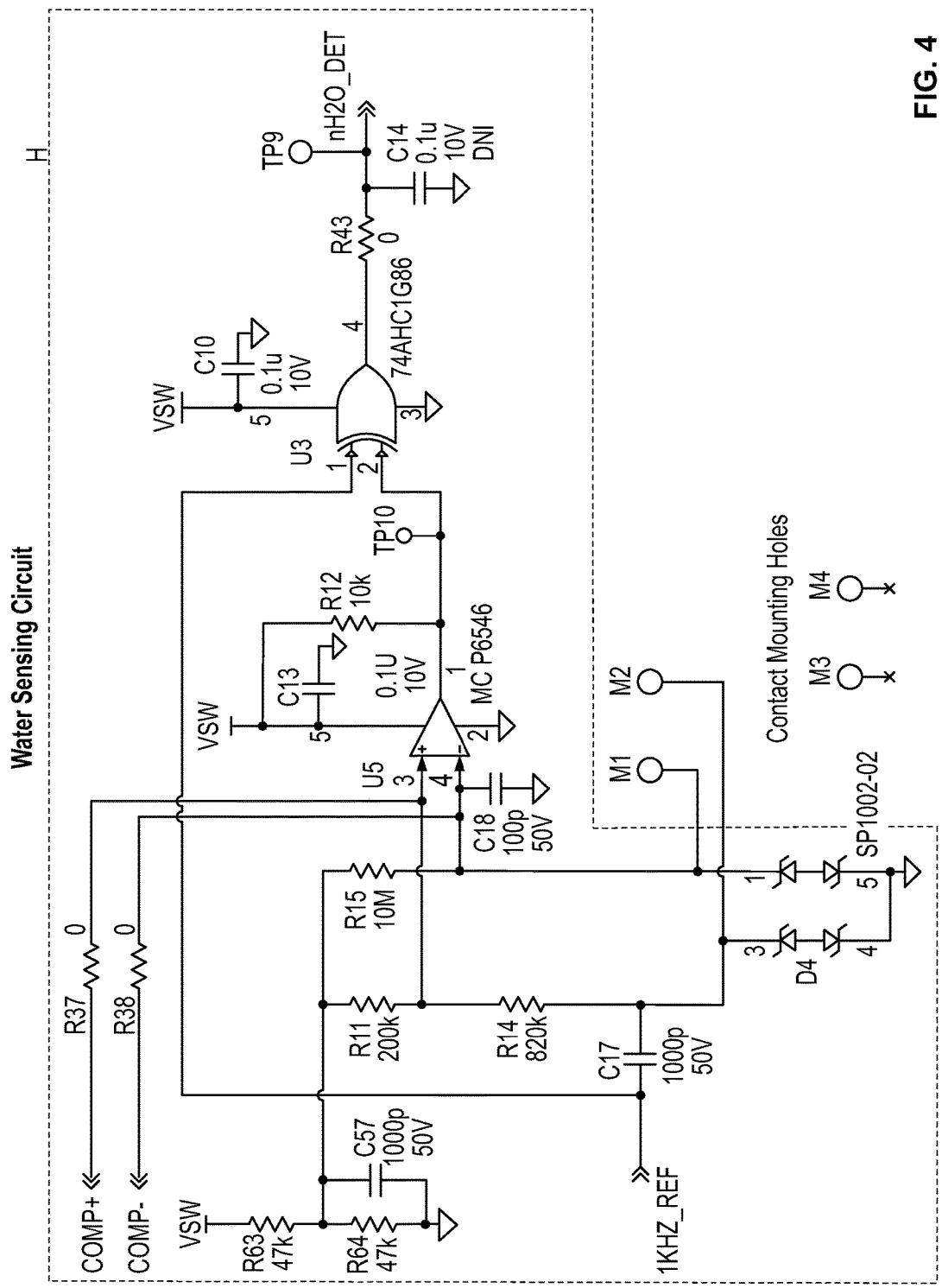
FIG. 4 illustrates a schematic view of a water sensing circuit.

One embodiment of a water sensing circuit is shown schematically in FIG. 4. The water sensing circuit may be enclosed within a housing H from which contacts (M1, M2, M3, and M4) may extend and/or be accessible. The water sensing circuit may measure the impedance between contacts (M1 and M2) of the water sensor by comparing at comparator U5 a reference signal with the reference signal through the water sensor contacts M1, M2.

In some embodiments, the reference signal may include a time varying voltage signal. In particular, the reference signal may comprise a varying voltage that produces a square wave, a sine wave, a triangle wave, or another waveform. Moreover, the reference signal may have a frequency between 10 Hz and 100 kHz.

Circuit elements C17, D4 and C18 form an AC divider for which the amplitude of the signal at element C18 is proportional to the ratio of the impedance across element D4 and the value of element C18. When the contacts are dry, the impedance across element D4 is very high, with the signal on the '−' input to comparator U5 having a lower amplitude than the reference signal on the '+' input. In this condition, the output signal of the comparator U5 is in phase with the reference signal. Although in this embodiment (described further below), the water sensor 101 includes two contacts (M1 and M2), in other embodiments the device may include three, four, or more contacts, which may take the form of prongs, screws, etc. Contacts M3 and M4 may in some embodiments provide a second avenue by which to detect the water. The contacts M1-M4 may comprise metallic contacts. In some embodiments, the contacts M1-M4 may be similar to the sensor contacts 111 illustrated in FIGS. 1A-B. In other embodiments, the contacts M1-M4 may comprise conductors of a cable or may be inserted into a building material (e.g., wall, floor, etc.)

Figure 5A:
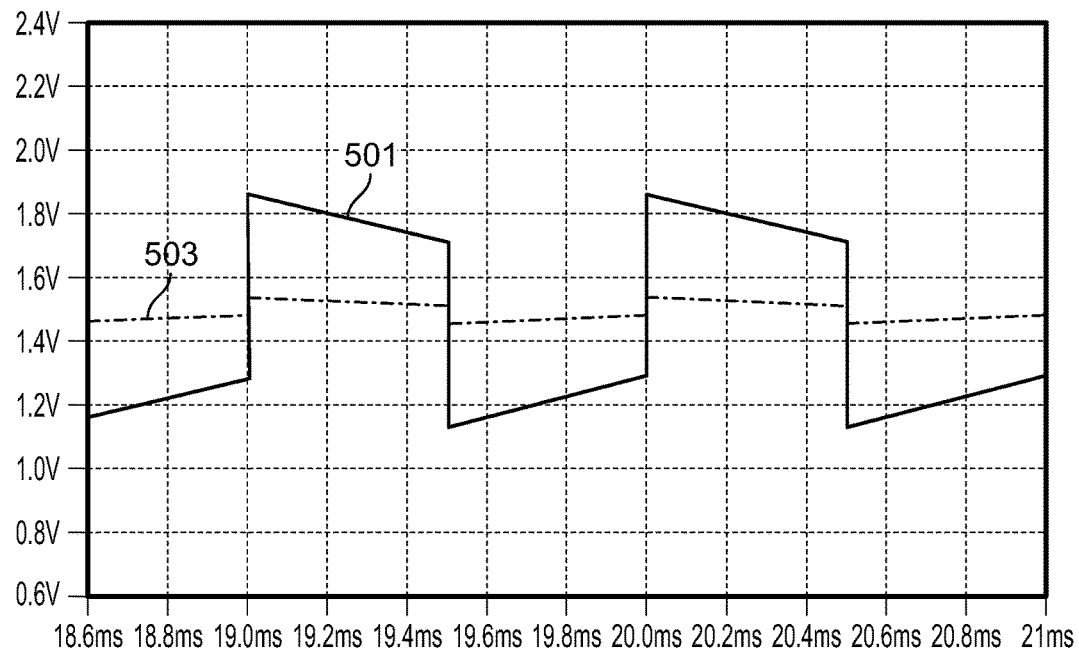
FIG. 5A is a graph of a representative water sensor circuit readout under a dry condition.
Figure 5B:
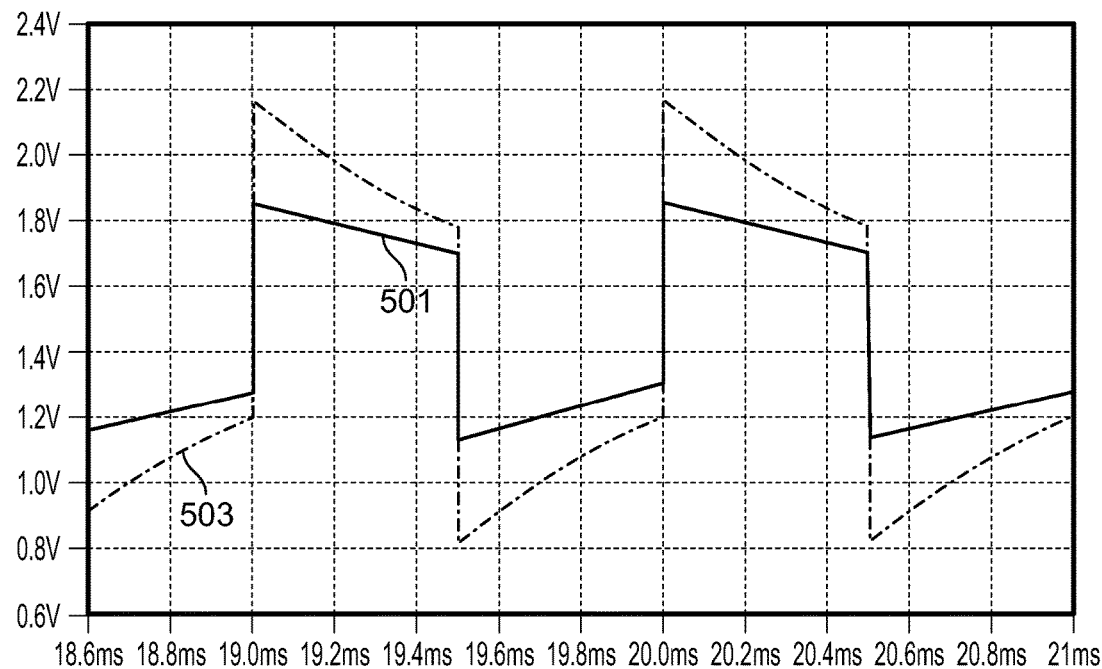
FIG. 5B is a graph of a representative water sensor circuit readout under a wet condition.

FIG. 5A illustrates a representative sensing circuit output under dry conditions, and FIG. 5B illustrates a representative sensing circuit output under wet conditions. The reference signal 501 (the signal on the '+' input to the comparator U5) is plotted alongside the signal 503 on the '−' input to the comparator U5. When the contacts M1 and M2 are dry, the impedance across element D4 is high relative to element C18, and the signal 403 on the '−' input to the comparator U5 is lower in amplitude than the reference signal 501 (FIG. 5A). When the contacts M1 and M2 are wet, the impedance across element D4 is very low relative to element C18, and the signal on the '−' input to the comparator U5 has a higher amplitude than the reference signal on the '+' input (FIG. 5B). In this wet condition, the comparator output signal is 180° out of phase with the reference signal. The exclusive-OR (XOR) gate U3 for in-phase signals generates a logic low output ("dry" condition), while the XOR gate U3 for 180° out-of-phase signals generates a logic high output ("wet" condition).

Figure 5C:
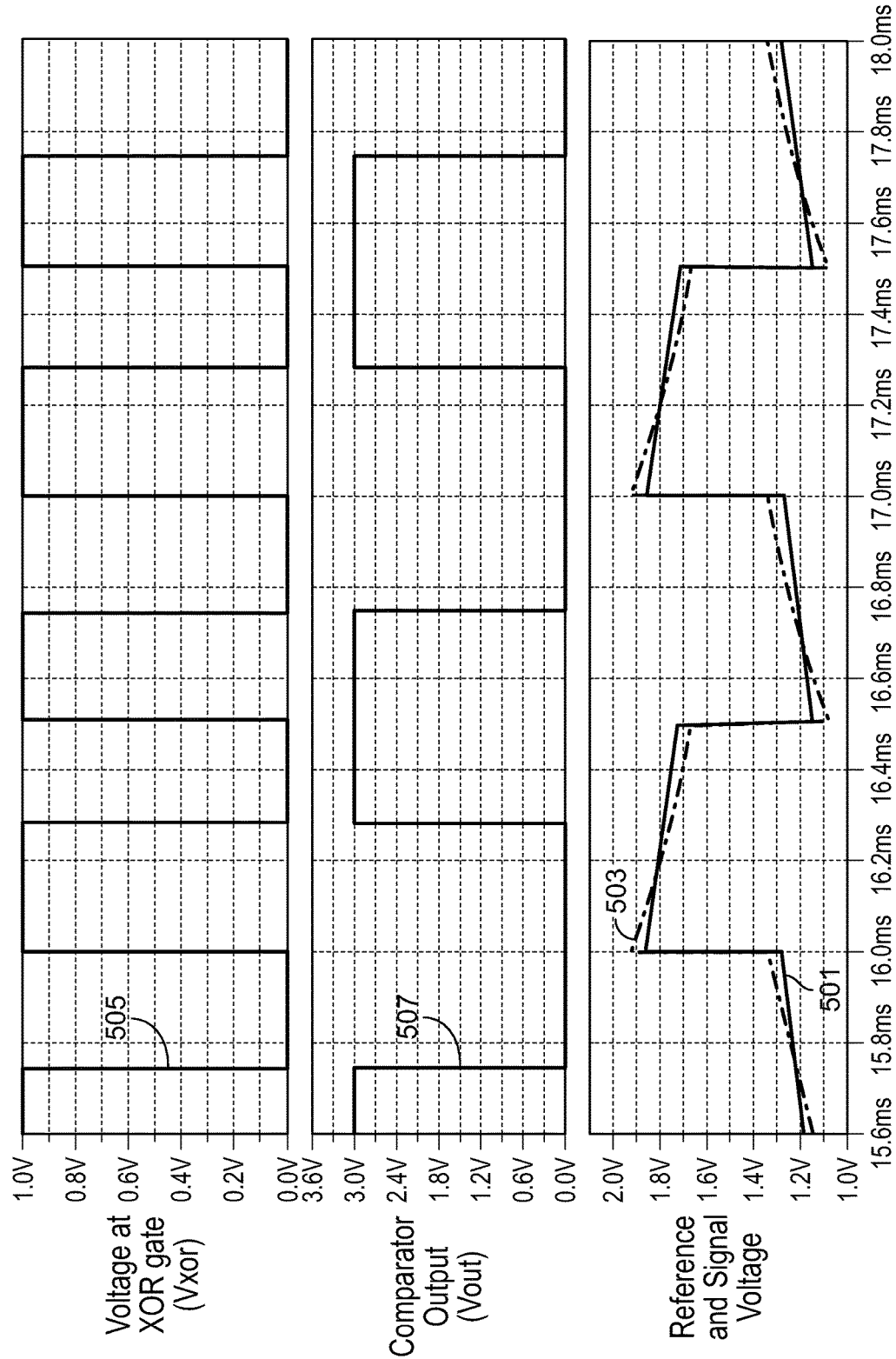
FIG. 5C is a graph of a representative water sensor circuit readout under a damp condition.

In between the dry and wet conditions, the impedance across element D4 increases as the water content present on the surface between the contacts M1 and M2 increases. The amount of wetness present will cause the signal on the '−' input to the comparator U5 to be higher than the reference signal for a portion of each cycle and lower for the remaining portion. FIG. 5C shows a representative example of this condition. The uppermost chart in FIG. 5C shows the output 505 of the XOR gate U3 and the middle chart shows the comparator output (Vout) 507 of comparator U5. The lower chart shows reference signal 501 (the signal on the '+' input to the comparator U5) plotted alongside the signal 503 on the '−' input to the comparator U5. Performing a duty cycle measurement of the XOR gate output signal 505 provides an indication of the percent "wetness" proportional to the duty cycle. In the illustrated example, the sensor detects 50% wetness, as the signal 503 is higher in amplitude than the reference signal 501 50% of the time, as indicated in the graph of the XOR gate output signal 505.

In some embodiments, the water sensor 101 disclosed herein may be used in conjunction with a wireless sensing network as disclosed below with respect to FIGS. 6-14. For example, the water sensor 101 may be coupled with an antenna to transmit a signal which may be coupled to infrastructure and propagated to a hub which is also coupled to the infrastructure. In some embodiments, the water sensor may be configured to transmit signals wirelessly over the air to the hub, e.g., via WiFi, Bluetooth, NFC, etc. In other embodiments, the water sensor may be utilized separately in other applications that do not use or rely on wireless transmission. For example, the water sensor may be configured to transmit an alarm signal or other output via a wire, rather than broadcasting wirelessly. In some embodiments, the water sensor may be equipped with a display (e.g., a digital display, one or more indicator lights, etc.) which provides indication of the measured wetness of the contacts.

Low Power Wireless Sensors and Supporting Infrastructure

According to basic electromagnetic theory, a time-varying current in a wire will produce an associated time-varying electromagnetic field around the wire, and a time varying electromagnetic field near a wire will produce an associated current in that wire. This is the basic premise of all antennas. Since the power lines in a home are essentially a collection of wires, they may potentially be used as antennas. Additionally, the antenna reciprocity theorem tells us that any antenna is an equally good transmitter or receiver.

The use of a power line as an RF antenna has been explored in various contexts as far back as the 1920's. Several patents describe various forms of a line cord antenna, whereby a receiver is coupled to the power line to receive high-powered broadcasts originating outside the home from TV and radio stations. Power lines have also been examined as transmitting antennas, which are further categorized for regulatory purposes as intentional or unintentional radiators of electromagnetic signals. As an intentional radiator, power lines have been used to distribute AM radio broadcast signals over the main power distribution grid. Within a home or other structure, power lines operating as intentional radiators have been used to distribute RF signals at up to 20 MHz for an indoor localization system, for a cordless phone system transmitter, and for an in-home video distribution system transmitter. As unintentional radiators, power lines unintentionally leak radiated RF fields from broadband over power line (BPL) signals. BPL signals are intended to be confined to the power lines, but nonetheless unintentionally radiate RF energy since power lines are not designed to function as radio frequency transmission lines. The development of power line tags (PL-Tags), disclosed in United States Patent Application Publication US 2010/0109842, Ser. No. 12/560,099, showed that the power line could be used as a receiving antenna for detecting low-frequency resonant RF energy from power line activated passive RFID tags.

A consistently emerging theme in ubiquitous computing for the home is that while it is possible to think of the home as a sensor-rich environment, there are practical roadblocks to widespread deployment. Though the research community and others have begun to define more and more compelling applications of sensor enabled environments, many remaining obstacles hinder the adoption of in-home sensors. Power requirements are a frequent source of concern for wireless sensor networks. Wireless sensors are appealing because they may be placed in a wide variety of locations throughout a home, but the high power consumption of most wireless communication technologies limit the sensor's battery life to an undesirably short operating period. Deploying tens or hundreds of wireless sensors in a home will result in an undesirably high maintenance cost due to the battery cost as well as the labor cost required to check and replace the sensor batteries.

Disclosed below are techniques that may reduce the power consumption requirements for transmission within a wireless sensor network. These techniques may exploit the existing infrastructure (such as domestic power wiring, copper plumbing, metallic beams or other structures, etc.) to support communication within a wireless sensor network. The Power Line Positioning (PLP) system, as disclosed in United States Patent Application Publication US 2008/0091345, and the Wideband Power Line Positioning (WPLP) system, as disclosed in United States Patent Application Publication US 2010/0109842, specifically used the in-home power line infrastructure as a transmitting antenna for location tags around the home. PL-Tags showed a short-range, passive RFID-like communication between the power line, as a receiving antenna, and mobile tags.

As disclosed herein, an ultra low-power transmitter contained within a sensor node may wirelessly couple its signals to infrastructure such as a power line acting as a receiving antenna. The power line thus acts as an antenna for a gateway receiver providing dense coverage within a home or building. The power requirements for this transmitter are potentially as low as tens of microwatts, which drastically alters the design trade-off for energy consumption in a wireless sensor network. Wireless sensor networks based on competing wireless technologies such as WiFi, Zigbee, or ZWave have a significant limitation because the power consumption of radio transceivers complying with these wireless communication standards dominates the overall power consumption of the sensor node.

In contrast, the disclosed apparatus, system, and techniques may greatly reduce power consumption for wireless data transmission in sensor networks. The battery life of a wireless sensor node using this technology would then be dominated by sensor and microprocessor power consumption rather than radio transceiver power consumption. Accordingly, proposed is a new model for building in-home wireless sensor networks that leverages the naturally occurring phenomenon of the existing home infrastructure acting as an antenna for sensor devices transmitting at high frequencies such as between about 1 to about 50 MHz. This system and technique allows wireless sensors to transmit at a much lower output power than would otherwise be necessary to cover a typical house.

Also disclosed herein is a simple low-cost technique for extending the range of mid to high-frequency consumer electronic devices by leveraging infrastructure as a reception antenna, thereby enabling practical deployments of low-power distributed sensor nodes in the home. Demonstrated herein is the feasibility of using existing in-home electrical wiring to extend the operational range of certain wireless devices. Specifically, a wireless keyboard operating at 27 MHz, which has an operational range of 1.5-2 meters on its own, was extended to work throughout a 3-story 4,000 square foot/371 square meter exemplary structure by coupling the antenna port on its receiver to the power lines. Coupling between the keyboard and the power lines occurred over the air, and coupling at the receiver was accomplished capacitively by simply wrapping a wire connected to the receiver's antenna port several times around a standard electrical device cord plugged into a wall socket. This phenomenon of the infrastructure as a communications infrastructure for inexpensive and low power wireless devices has a variety of interesting potential applications in the home.

The disclosed system uses existing infrastructure in a building as a distributed reception antenna capable of receiving signals from very low-power wireless sensors, thus allowing these sensors to be detected at ranges that are otherwise impractical with over-the-air reception from a single antenna located at an arbitrary point in a building. Also disclosed is a wireless sensor platform that may be sensed throughout a building with very low current draw. The disclosed technique may also be utilized to extend the range of mid-frequency consumer electronic devices by leveraging the infrastructure as a reception antenna enabling practical deployments of low-power distributed sensor nodes in the home.

According to one aspect of the disclosure, in a structure having an electrical power line infrastructure disposed therein, a system comprises: A) a receiving apparatus electrically coupled to the electrical power line infrastructure at an electrical node of the electrical power line infrastructure, the receiving apparatus being responsive to signals of a predetermined frequency band (e.g. 1 MHz to 50 MHz, 6 MHz to 40 MHz, or approximately 13.56 MHz); and B) a source of electromagnetic signals disposed within or proximate to the structure, not electrically connected to the electrical power line infrastructure, but configured to wirelessly transmit electromagnetic signals in the predetermined frequency band to at least one of a plurality of access points of the electrical power line infrastructure.

According to a second aspect of the disclosure, in a structure having an electrical power line infrastructure disposed therein, a method comprises: A) electrically coupling a receiving apparatus to the electrical power line infrastructure at an electrical node of the electrical power line infrastructure, the receiving apparatus responsive signals of a predetermined frequency band; B) disposing a source of electromagnetic signals within the structure; C) wirelessly transmitting electromagnetic signals in the predetermined frequency band from the source to at least one of a plurality of access points of the electrical power line infrastructure; and D) detecting at the receiving apparatus signals from the source within the predetermined frequency band as transduced by the electrical power line infrastructure.

According to a third aspect of the disclosure, in a structure having an electrical power line infrastructure disposed therein, a method comprises A) providing a wireless transmitter, configured to wirelessly transmit electromagnetic signals of a predetermined amplitude over a predetermined distance and within a predetermined frequency band, and a receiving apparatus responsive to signals within the predetermined distance and the predetermined frequency band; B) electrically coupling the receiving apparatus to the electrical power line infrastructure at an electrical node thereof; C) disposing the wireless transmitter within the structure at a distance relative to the receiving apparatus greater than the predetermined distance but within the predetermined distance relative to at least one of a plurality of access points of the electrical power line infrastructure; and D) detecting at the receiving apparatus signals from the wireless transmitter within the predetermined frequency band as transduced by the electrical power line infrastructure.

According to a fourth aspect of the disclosure, in a structure having an electrical power line infrastructure disposed therein, a sensor system comprises: a receiving apparatus electrically coupled to the electrical power line infrastructure at an electrical node thereof and responsive signals of a predetermined frequency band; and a plurality of sensors configured to wirelessly transmit electromagnetic signals over a predetermined transmission distance and within a predetermined frequency band, the sensors disposed within the structure at a distance relative to the receiving apparatus greater than the predetermined transmission distance but within the predetermined distance relative to at least one of a plurality of access points of the electrical power line infrastructure.

In other aspects of the disclosure, the infrastructure of the structure may include other conductive elements. Representative examples include plumbing, beams, panels, and studs.

The existing infrastructure of a home or other structure may be used as a wired transmission line. Examples of such existing infrastructure include power wiring, copper or other metallic plumbing, metal beams and studs, or other metallic or otherwise electrically conductive structural elements (e.g., metallic panels of a vehicle, a bridge, etc.). In each instance, elongated and conductive infrastructure may be used to propagate a signal from a remote sensor to a receiver. In some embodiments, a sensor may be coupled to the infrastructure to induce a signal to propagate along the infrastructure towards a receiver. If the receiver is coupled to the power line, then the sensors may be configured to couple either to the power line directly, or to other conductive infrastructure that is itself coupled to the power line (e.g., connected to a grounded terminal that is in turn coupled to the power line). For example, in one embodiment a sensor may be coupled to copper plumbing such that a signal emitted from the sensor propagates along the copper plumbing. If the copper plumbing is grounded (and therefore coupled to the power line), then the signal may propagate along the copper plumbing and eventually couple to the power line at the point at which the copper plumbing is grounded. The signal may then propagate along the power line and be detected by the receiver, which is coupled to the power line. In other embodiments, both the sensor and the receiver may be coupled to conductive infrastructure other than the power line. For example, both the sensor and the receiver may be coupled to copper plumbing, such that signal emitted from the sensor propagates along the copper plumbing and is detected by the receiver. Various examples of utilizing existing infrastructure to propagate a signal are provided below. Although many examples disclose utilizing a power line in particular, in various embodiments other infrastructure components may be used instead or in addition to the power line, such as plumbing, metallic beams, studs, panels, or other elongated structures that may support propagation of a signal. In some other embodiments, the infrastructure may be part of a vehicle, bridge, or other such object, and the technology disclosed herein is not limited to buildings such as a house or office structure.

Although several examples below describe embodiments utilizing a particular frequency, for example 27.12 MHz, the present technology is operable over any suitable frequency between about 1 MHz and about 50 MHz. The particular frequency selected for any particular application may vary based on a number of parameters, including the infrastructure used to carry the signal, distance of the sensor from the infrastructure, etc.

Power Line as a High-Frequency Signal Conduit

Disclosed is a system that uses existing infrastructure in a building as a distributed reception antenna capable of receiving signals from very low-power wireless sensors, thus allowing these sensors to be detected at ranges that are otherwise impractical with over-the-air reception. Also disclosed is a wireless sensor platform that is able to be sensed throughout a building with very low current draw. The disclosed technique may also be utilized to extend the range of mid-frequency consumer electronic devices by leveraging the infrastructure as a reception antenna.

In accordance with this disclosure, a series of tests of the existing infrastructure, in particular the power line infrastructure of a home or other structure, have been conducted. In these tests the power wiring of the home or other structure are used as a wired transmission line, with the transmitter and receiver directly connected to the power lines. In these tests measurements were made of the signal propagation attenuation and noise power at frequencies significantly higher than the 60 Hz power signal for which the power lines were designed. In order to act as a conduit for very low power wireless sensors, the power line should be reasonably efficient at conducting signals of the frequency used by the sensor network.

The majority of the radio spectrum is reserved for licensed use, ensuring that wireless services such as mobile telephones, television and radio broadcasting, and radio-navigation services are generally free from interference. The International Telecommunication Union (ITU), a United Nations agency responsible for coordination of the radio spectrum on a global level, has specified several bands of radio spectrum that local governments should make available for unlicensed devices. These spectrum areas are commonly referred to as the Industrial, Scientific, and Medical (ISM) bands. Common ISM devices include WiFi (IEEE 802.11 a/b/g) devices, Bluetooth devices such as wireless headsets, and wireless keyboards and mice with proprietary radio protocols. A list of the ITU suggested ISM spectrum allocations are shown in Table 1. Although in some countries, such as the United States, use of spectrum outside of the ISM regions is permitted (for example, under Part 15 of the US Federal Communications Commission regulations), the ISM spectrum allocations are more globally applicable. Note that the 433.92 MHz and 915.00 MHz bands commonly used for inexpensive wireless devices such as garage door openers or wireless security sensors are also not globally available. In accordance with the ITU spectrum plan the following five frequencies are considered for transmission of signals along power lines: 6.78 MHz, 13.56 MHz, 27.12 MHz, 40.68 MHz, and 2.45 GHz. These frequencies were selected for simplicity, but in some embodiments any frequency between about 1 and about 50 MHz may be used.

TABLE 1

| ITU specified Industrial, Scientific, and Medical (ISM) spectrum up to 2.4 GHz. | | | |
|---|---|---|---|
| Center Frequency | Range (MHz) | FCC Regulated Max. Field Strength | FCC Max. EIRP (dBm) |
| 6.78 MHz [a] | ±0.015 | 15 µV/m @ 30 m | −51.71 dBm |
| 13.56 MHz | ±0.007 | 15,848 µV/m @ 30 m | +8.77 dBm |
| 27.12 MHz | ±0.163 | 10,000 µV/m @ 3 m | −15.23 dBm |
| 40.68 MHz | ±0.020 | 1,000 µV/m @ 3 m | −35.23 dBm |
| 433.92 MHz [b] | ±0.870 | | — |
| 915.00 MHz [c] | ±13.000 | | +36.00 dBm [d] |
| 2.45 GHz | ±50.000 | | +36.00 dBm [d] |

[a] Subject to approval by the local regulatory body in the country of interest.
[b] ITU Region 1 only (Europe, Africa, the Middle East west of the Persian Gulf, the former Soviet Union, and Mongolia).
[c] ITU Region 2 only (The Americas, Greenland, and some eastern Pacific Islands).
[d] For digital modulation schemes having bandwidth of at least 500 kHz.

Figure 6:
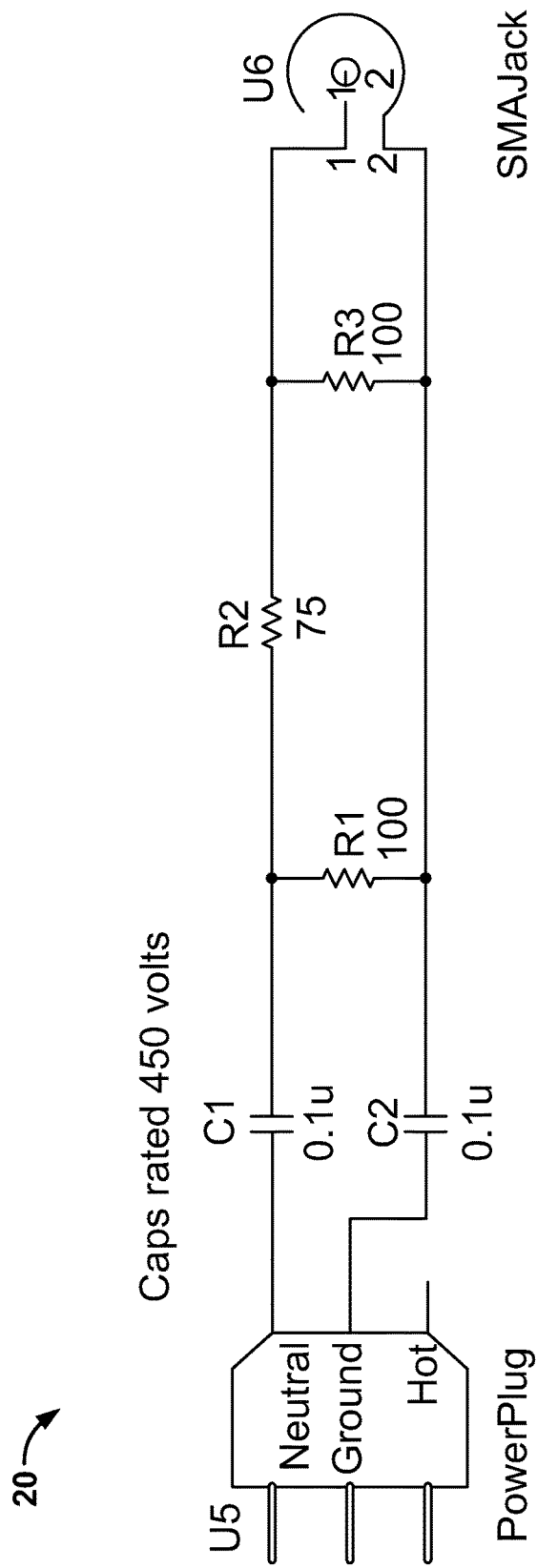
FIG. 6 illustrates a power line coupling box used to connect a high frequency receiver to the power line infrastructure of a building.

To test the power line as a transmission line at the selected frequencies, a high-frequency coupling box was used to electrically couple a spectrum analyzer to the power line infrastructure. FIG. 6 illustrates an electrical schematic of a coupling box 20 in accordance with one embodiment which may be used to connect a high frequency receiver, such as a spectrum analyzer 18 or other receiving device, to the power line while isolating it from the 50-60 Hz power signal. As illustrated, coupling box 20 comprises a standard 3 prong plug U5 connected to the power line. A test signal is injected through connector U6 into the power line via a configuration of resistors R1, R2 and R3 and capacitors C1-C2. The coupling box 20 isolates the test equipment from the low frequency, high-voltage power signal, but allows high frequency signals to pass through. Two such coupling boxes were utilized, one to inject a high-frequency signal into the power line using an Agilent E4433B signal generator, and one to measure the received signal with a Rhode & Schwarz FSH8 spectrum analyzer.

The experiments, the results of which are presented in Table 2, were performed first in a 3-story, 371 square meter home built in 2003. Data was obtained by using the signal generator to inject a 0 dBm (1 mW) signal into the power line at each of the five frequencies. The signal generator was connected to the power line via the coupling box plugged into an outlet in the dining room. During the tests the signal generator was powered by a battery operated uninterruptable power supply (UPS) to isolate any signal leakage from its power supply. The received signal strength was then measured using the spectrum analyzer by connecting it to a single, representative outlet in each of nine listed rooms on the three floors. Average attenuation for the ISM frequencies from 6.78 MHz through 40.68 MHz ranged from 47 to 53 dB. At 2.45 GHz, no signal could be detected over the power line in any of the rooms. Given the foregoing, further exploration was limited to 6.78 MHz, 13.56 MHz, 27.12 MHz, and 40.68 MHz. These frequencies were selected for simplicity, but in some embodiments any frequency between about 1 and about 50 MHz may be used.

Table 2 illustrates the received signal strength of a signal directly injected into the power line, as sensed in each of nine rooms of the test home. The signal was injected in the dining room (see FIG. 10) at a power of 0 dBm, thus the numbers in this table represent the amount of attenuation caused by the power line. No signal was detected over the power line in any room for 2.45 GHz. The measured loss induced by the two power line coupling boxes at each frequency was subtracted from these figures to give only the loss caused by the power line.

TABLE 2

| Frequency (MHz) | Basement | | | 1st Floor | | | 2nd Floor | | |
|---|---|---|---|---|---|---|---|---|---|
| | Media | Family #2 | Bed #4 | Dining | Kitchen | Family #1 | Master Bed | Bed #2 | Bed #3 |
| 6.780 | −41.2 | −57.5 | −44.9 | −19.2 | −51.6 | −50.8 | −69.0 | −72.0 | −45.5 |
| 13.56 | −56.8 | −60.8 | −61.1 | −33.3 | −53.1 | −55.9 | −57.1 | −54.3 | −50.2 |
| 27.12 | −43.3 | −53.5 | −61.6 | −21.7 | −55.9 | −61.6 | −58.1 | −50.4 | −40.7 |
| 40.68 | −38.3 | −46.2 | −66.7 | −35.5 | −44.6 | −55.2 | −53.9 | −51.6 | −31.1 |
| 2450 | — | — | — | — | — | — | — | — | — |

Figure 8:
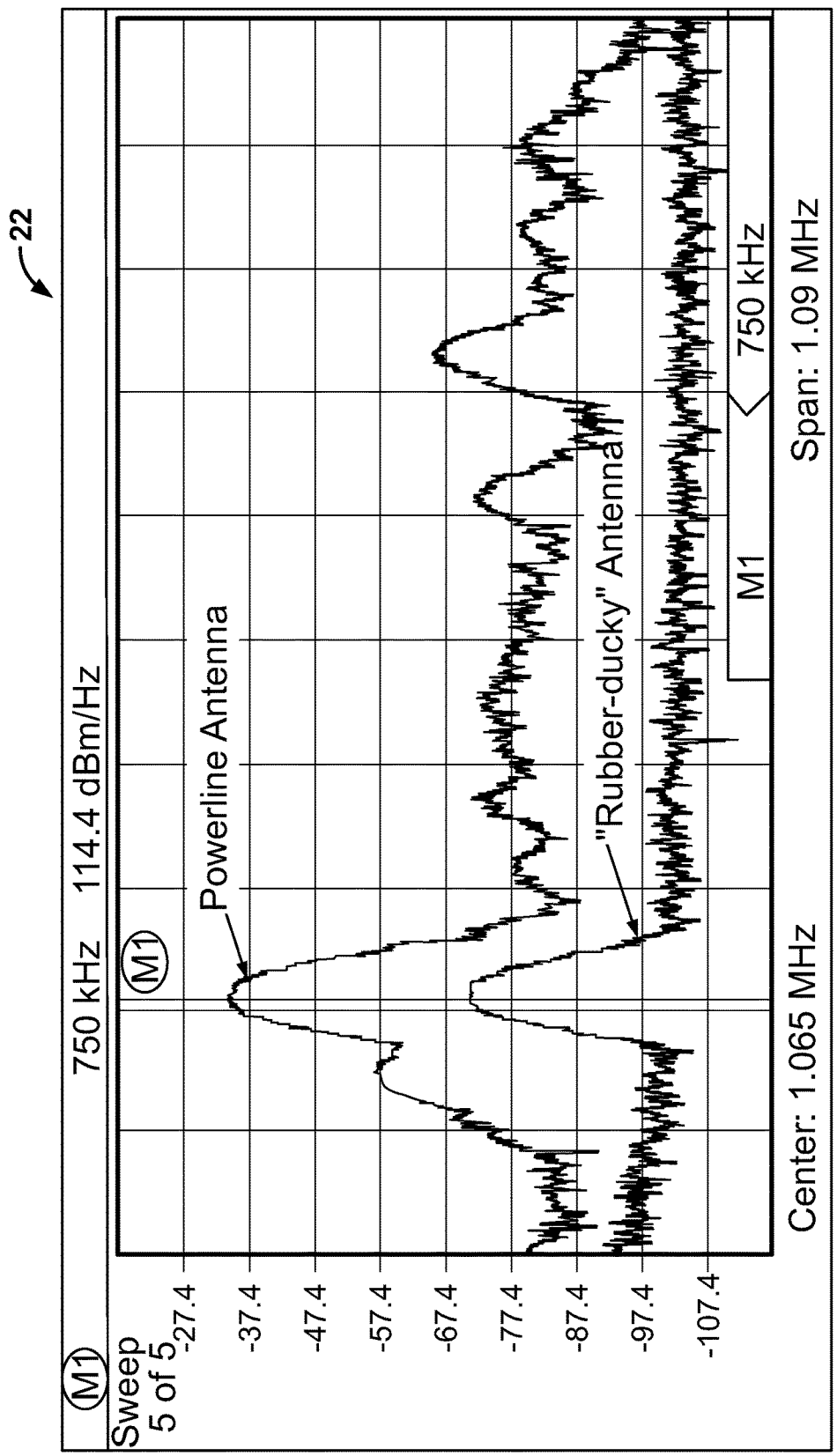
FIG. 8 illustrates the AM radio broadcast spectrum (520-1610 kHz in the US) as sensed by the spectrum analyzer when connected to the power line through the coupling box of FIG. 6.

The capability of a test home's power line to receive signals in the US AM radio broadcast band was verified by connecting a spectrum analyzer to the power line and monitoring the 520-1610 kHz band. The graph 22 of FIG. 8 illustrates the AM radio broadcast spectrum (520-1610 kHz in the US) as sensed by the spectrum analyzer when connected to the power line infrastructure of the home through the coupling box 20, and a standard "rubber ducky" antenna, typical of hand-held radio scanners. Note that AM radio stations are received with much greater signal strength over the power line antenna than with the rubber ducky antenna. A marker is placed at 750 kHz, which is a local AM radio station.

Figure 9:
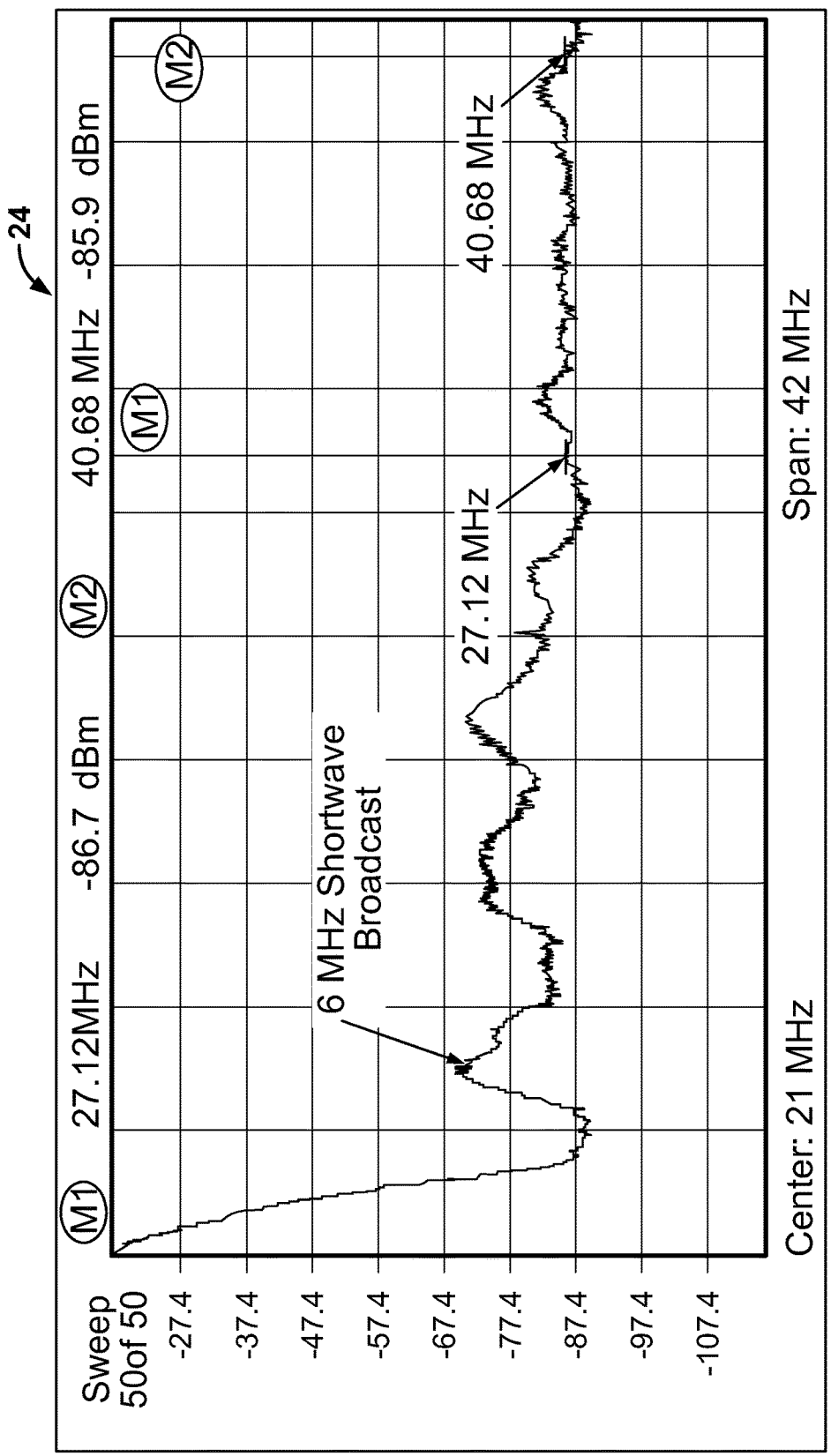
FIG. 9 illustrates the Noise floor of the power line from 100 kHz to 42 MHz of the exemplary structure of FIG. 7, using the coupling box of FIG. 6.

The exploration of the power line as a receiving antenna for low-power wireless signals originating within the home begins by making a final selection of a frequency to explore, between 27.12 MHz and 40.68 MHz, as discussed. However, any of the above mentioned frequencies could be used depending on the application needs. Since the objective is to use the power line for receiving very low-power wireless transmissions, a frequency band that is relatively quiet on the power line is selected. The graph 24 of FIG. 9 illustrates the power line background noise from 100 kHz to 42 MHz and specifically points out the two frequencies still in consideration (27.12 MHz and 40.68 MHz). Both of these frequencies fall in relatively quiet regions of the power line, and so background noise levels did not influence the selection of one of these two frequencies within a band of frequencies from 27 MHz to 42 MHz.

Another consideration in selecting a frequency is the size of an efficient antenna at that frequency. For example, although the power line has proven to be a reasonably reliable conduit for signals in the 100 kHz range (X10 and Insteon), frequencies this low are generally not practical for wireless communication due to the very large size of efficient antennas for these frequencies. Although both X10 and Insteon offer wireless remote controls for operation of any X10 or Insteon-enabled devices, these wireless remotes operate at higher frequencies (310 MHz in the US, under FCC Part 15 regulations) and do not directly couple with the power line—a bridge between the high-frequency wireless channel and the low-frequency power line channel is needed. This is because the size of an efficient antenna at any given frequency is proportional to the wavelength of the signal. A common antenna design is the ½ λ or ¼ λ dipole, where λ represents the wavelength of the frequency at which the antenna is designed to operate. At 120 kHz, a ¼ λ dipole antenna would be 625 m long. In contrast, the higher frequencies utilized by HomePlug devices (2-28 MHz) are much more applicable to wireless communication. As a comparison, a ¼ λ dipole antenna at 28 MHz is 2.7 m, vs. 625 m at 120 kHz. The shorter wavelength of these higher frequencies is important in that the transmitting antenna for wireless sensors may be smaller, and also in that a typical home will contain numerous segments of power line in the walls on the order of several meters, but certainly no segments of hundreds of meters.

Ultimately, the frequency of 27.12 MHz is an example of one frequency that may be used for power line based low-power wireless signal reception due to regulatory constraints, but other frequencies may be chosen depending on the noise profile of the target environment. For example, in some embodiments a frequency of approximately 13.56 MHz may be used. Revisiting Table 1, the third and fourth columns now become important. Within each frequency band, the FCC has specified a maximum power at which devices may operate. This is typically specified as a maximum field strength in pV/m at some distance from the transmitter. Equation 1 hereafter expresses the electric field as a function of the transmitter power (PT), the antenna gain (TG), and the distance from the transmitting antenna (r).

Figure 7:
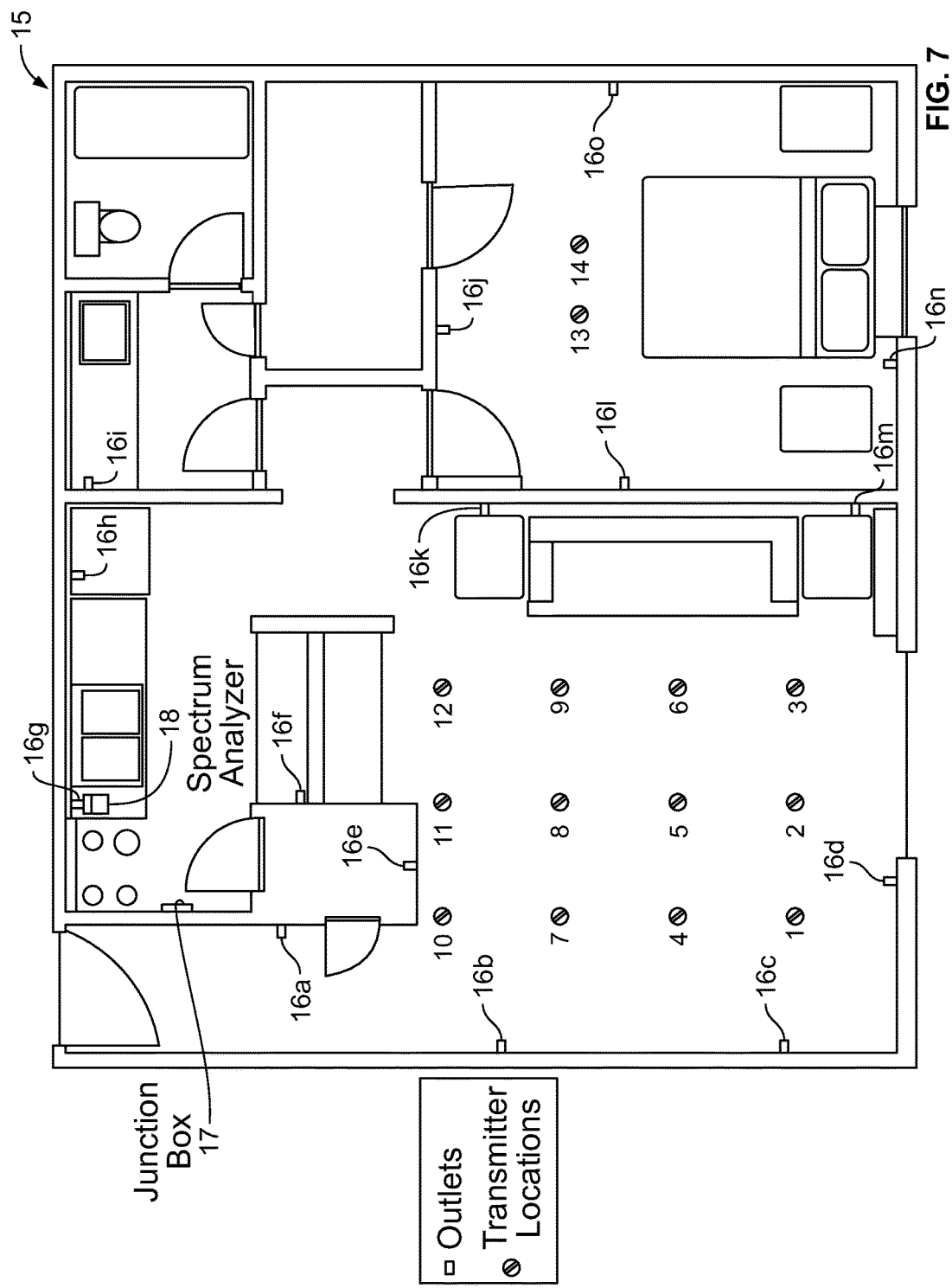
FIG. 7 illustrates the floor plan of an exemplary structure, with numbered dots indicating test points for the Signal-to-Noise Ratio map of FIG. 10.

As noted, the graph 24 of FIG. 9 illustrates a noise floor of the power line from 100 kHz to 42 MHz using the coupling box 20 and the R&S FSH-8 spectrum analyzer 18. The sample was taken in the kitchen of the test home, as shown in FIG. 7. The peaks generally represent various radio broadcasts from outside the home. The second from left, for example, is a 6 MHz shortwave-radio AM broadcast. Note that the noise floor is artificially raised by several dB when sampling such a large chunk of spectrum at once. FIG. 7 illustrates a floor plan of an exemplary structure 15, here an apartment unit, used for tests. The building was constructed in approximately 1969 and the apartment is approximately 37 square meters. In FIG. 7, numbered dots 1-14, indicate test points for the map of FIG. 10. Also illustrated within the structure 15 of FIG. 7 are access points 16a-p to the power line infrastructure within the unit as well as the location of junction box 17 and spectrum analyzer 18. The access points 16a-p may be used as the receiving device for signals transduced by the power line infrastructure during testing. Furthermore, such access points 16a-p may include electrical outlets, electrical switches, wall switches, fuse boxes, junction boxes, conductive leads, circuit breaker panels, etc.

TABLE 3

ITU specified Industrial, Scientific, and Medical (ISM) spectrum up to 2.4 GHz.

| Center Frequency | Range (MHz) |
|---|---|
| 6.78 MHz | ±0.015 |
| 13.56 MHz | ±0.007 |
| 27.12 MHz | ±0.163 |
| 40.68 MHz | ±0.020 |
| 433.92 MHz | ±0.870 |

TABLE 3-continued

ITU specified Industrial, Scientific, and Medical (ISM) spectrum up to 2.4 GHz.

| Center Frequency | Range (MHz) |
|---|---|
| 915.00 MHz | ±13.000 |
| 2.45 GHz | ±50.000 |

$$E = \frac{\sqrt{30 P_T G_T}}{r} \text{ Volts/meter} \quad (1)$$

$$P_T = \frac{E^2 r^2}{30} \quad (2)$$

Power in radio systems is often quoted as EIRP (Effective Isotropic Radiated Power), which refers to the power output of the system from a hypothetical isotropic antenna (a point-source which radiates equally in all directions). The EIRP from Equation 1 may be calculated by setting CT to 1 and rearranging to solve for PT, giving Equation 2. These equations are how the fourth column of Table 1 was calculated. This column provides us with a good estimate of the maximum output power a wireless transmitter may have at each of these frequencies and still be within regulations. Table 3 reflects the reasoning that leads to a selection of 27.12 MHz as the frequency for a very low-power wireless sensor network. However, as noted above, in other embodiments other frequencies may be used for a low-power wireless sensor network.

Strictly over-the-air communication was not possible at 27.12 MHz throughout the test structure. A transmitter was configured, which consisted of a signal generator, producing a 27.12 MHz carrier signal at −35 dBm (0.32 NW) and AM modulated with a 550 Hz tone, connected to a 27 MHz Citizens' Band antenna that was placed close to an outlet in the dining room. The receiver consisted of a hand-held radio scanner (a RadioShack PRO-97) tuned to 27.12 MHz and used to listen to the 550 Hz tone. A quick survey of the test home using the "rubber-ducky" antenna that came with the scanner was performed.

Where the 550 Hz tone may be heard clearly, the 27.12 MHz carrier signal is considered to be strong enough; where the tone cannot be heard indicates that the signal is too weak to be detected there. It was observed that outside of the dining room/foyer area where the transmitting antenna was placed, the signal was generally too weak to be detected by the scanner. When bringing the scanner's antenna close to an outlet, wall switch, or other plugged-in electrical device, the signal could be heard faintly. This indicates that the 27.12 MHz signal coupled from the transmitting antenna onto the power line and was being radiated, albeit weakly, by the power line at various other points in the home. In practice, the receiver may be connected directly to the power line, so the next step was to connect the scanner to the power line via the coupling box of FIG. 6. This process was repeated at a variety of outlet locations throughout the home and noted that the signal could be easily detected in every room of the home by directly connecting to the power line. Not every outlet resulted in good reception, but the vast majority of outlets were satisfactory.

An experimental equipment configuration for initial testing of the power line as a receiving antenna comprised a signal generator electrically isolated by being placed on a plastic cart and powered by a UPS. A 27 MHz antenna (a Cobra HG A1000 designed for Citizens' Band radio use) was used to transmit a 27.12 MHz signal AM modulated at 550 Hz and at a power of −35 dBm (0.32 pW).

The above empirical evidence suggesting that the 27.12 MHz signal coupled to the power line over the air, a determination was made as to how far away the transmitting antenna could be from the power line and still be sensed by a power line connected receiver at most outlets within the home. The antenna was moved away from an outlet in increments of 2.5 cm and used the power line coupled scanner to check for the signal at various outlets throughout the home. It was determined that a transmitter output power of −35 dBm, the antenna could be up to 60 cm away from the outlet before the signal was too weak to be detected by the receiving scanner. Generally, the further the antenna was away from the power line, the weaker the signal detected by the scanner. Coupling is not limited to outlets, however. A similar effect could be observed by bringing the transmitting antenna close to other electrical wiring, such as a wall switch. As a final test, it was observed that some of the outlets in the test home served as particularly good coupling locations for the receiver 18. One of these, located in the basement, is near to the circuit breaker for the entire house, and so is in close proximity to every circuit in the home as result. Connecting the receiver to this outlet allowed testing the range of the transmitting antenna in a best-case scenario.

Figure 10:
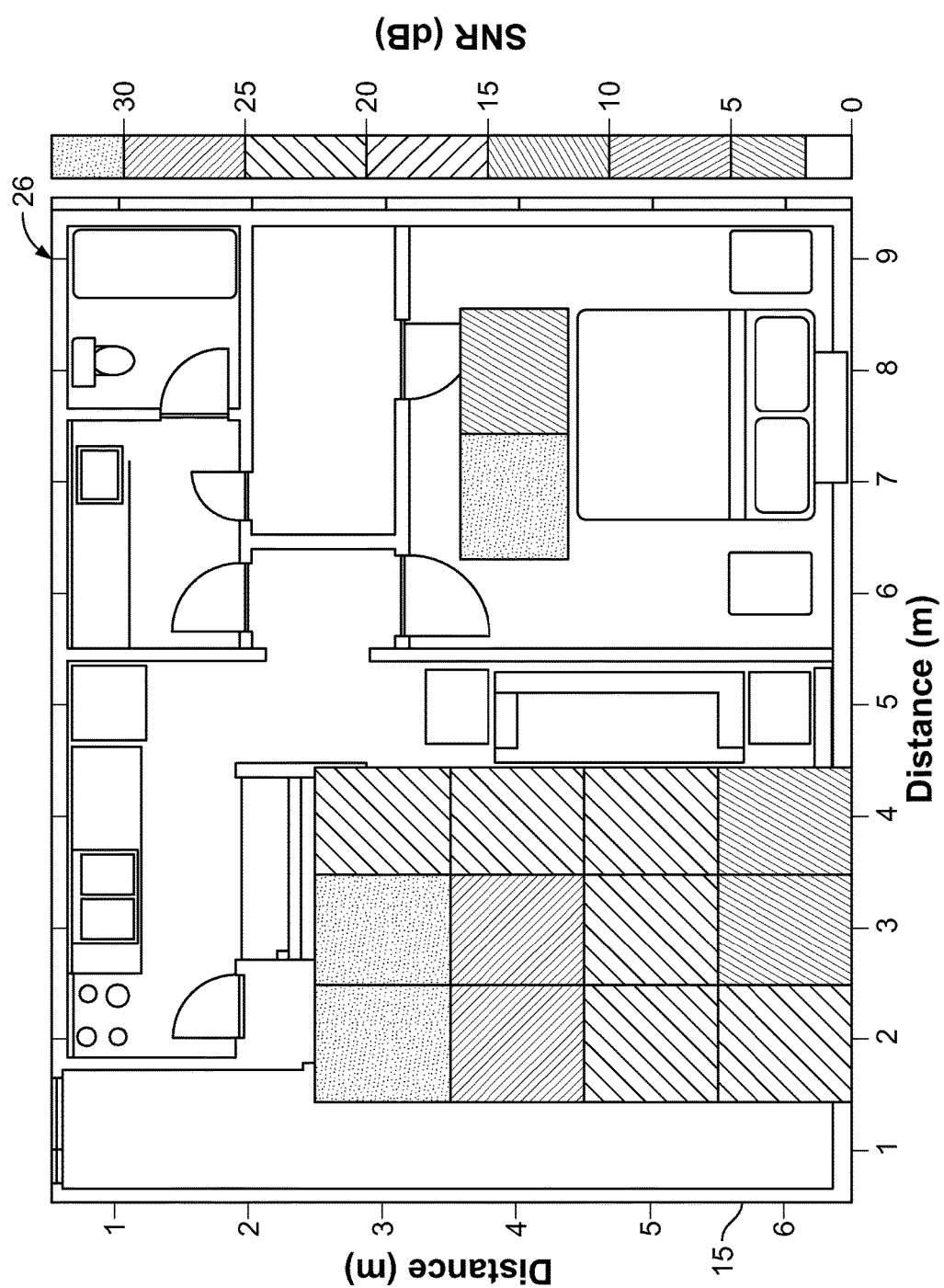
FIG. 10 illustrates a map of the exemplary structure of FIG. 7 indicating the Signal-to-Noise Ratio (SNR) for a 27.12 MHz wireless transmitter at each indicated location as received by a fixed power line coupled receiver in the kitchen.

FIG. 10 illustrates a heat-map 26 of the test structure 15 indicating the Signal-to-Noise Ratio (SNR) for a 27.12 MHz wireless transmitter located at each of transmitter locations 1-14 of FIG. 7 as received by a fixed power line coupled receiver in the kitchen. The transmitter utilized an output power of 35 dBm (0.32 pW) and a custom-built 27 MHz loop antenna. While there are some important limitations to this test (measurements were taken from a fixed height of approximately one foot off the ground), it does reveal great promise for using this solution to support a whole-house wireless sensing solution, the larger systems issues of whole-house, low-power sensing discussed in the next section.

Whole-House, Low-Power Sensing Apparatus

Figure 11:
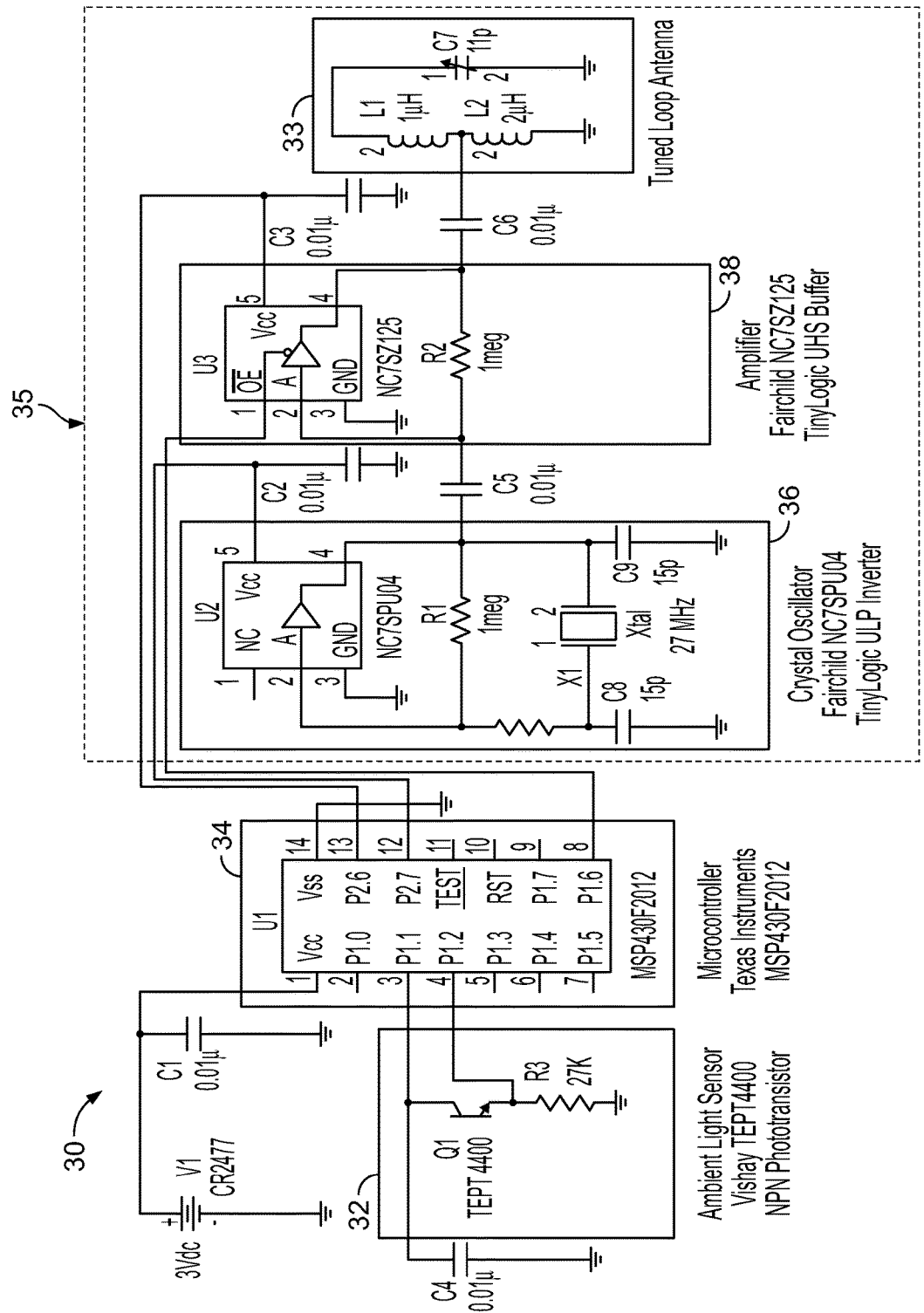
FIG. 11 illustrates a circuit diagram of a power line-based wireless sensor.

The ability of the existing infrastructure, such as the power line within a structure, to receive and transmit radio frequency signals, facilitates the use of one or more low-power sensors within the home to construct comprehensive sensor networks. FIG. 11 illustrates a circuit diagram of one embodiment of a power line-based wireless sensor 30. In the illustrative embodiment sensor 30 comprises a microcontroller 34 with an attached sensor transducer 32 and a radio 35. The radio 35 comprises a crystal 36 with a low-power amplifier 38 and a tuned loop antenna 33. The radio 35 and the crystal 36 may be configured based on the desired frequency, for example 13.56 MHz, 27.12 MHz, or other desired frequency. In some embodiments, the frequency may be between about 1 and about 50 MHz. The crystal 36 and amplifier 38 could be turned on and off by adjusting the voltage on a control pin, which is driven by the microcontroller's serial bus output. A microcontroller suitable for use a microcontroller 34 is commercially available from Texas Instruments, Dallas, Tex., model MSP430. A crystal oscillator 36 suitable for use with radio 35 is commercially available from Fairchild Semiconductor, San Jose, Calif. 95134, model number NC7SPU04. Similarly, an amplifier suitable for use with radio 35 is commercially available from Fairchild Semiconductor, model number NC7SZ125.

In the illustrative sensor embodiment of FIG. 11, sensor transducer 32 may be implemented with an ambient light sensor. An ambient light sensor component suitable for use as sensor transducer 32 is the Vishay TEPT4400 NPN photo transistor, commercially available from Vishay Electronics, Shelton, Conn. 06484. However, other optical sensors may be equally utilized as sensor transducer 32, as well as any other type of sensor transducer, including, but not limited to, sensor transducers of different types, including those measuring temperature, vibration, moisture, sound, etc.

An On-Off-Keying (OOK) modulation scheme may be used for transmitting data from sensor 30. On-Off-Keying—wherein the transmitter is on to transmit a binary value of one and off to transmit a binary value of zero—is a very simple modulation scheme for low power devices. In an exemplary embodiment, the sensor 30 transmits a packet of 16 bits once per second at a bit rate of 62.5 kilobits per second. The 16 bits may consist of five bits for the sensor's ID, followed by ten bits for the value of the light sensor, followed by one stop bit—if more than thirty two sensors are needed per home, or if more granularity is desired in the sensor reading, additional bits may easily be added to the transmission packet as appropriate. See, FIG. 13.

The radio 35 may operate on just 1.5 mA at 1.2 V (this is in addition to the 165 pA used by the microcontroller 34). The microcontroller 34 is programmed to transmit a sensor reading once per second and to shut off the oscillator 36 during the interim sleep period, making the sensor's duty cycle 0.941 milliseconds. With the amplifier 38 and oscillator 36 used, the transmit power was actually more than sufficient to be sensed everywhere in the test house, and so the power draw could actually be reduced by utilizing more efficient oscillators and amplifiers. The disclosed wireless sensor platform is able to be sensed throughout a building with approximately 6.3 pA average current draw.

Figure 12:
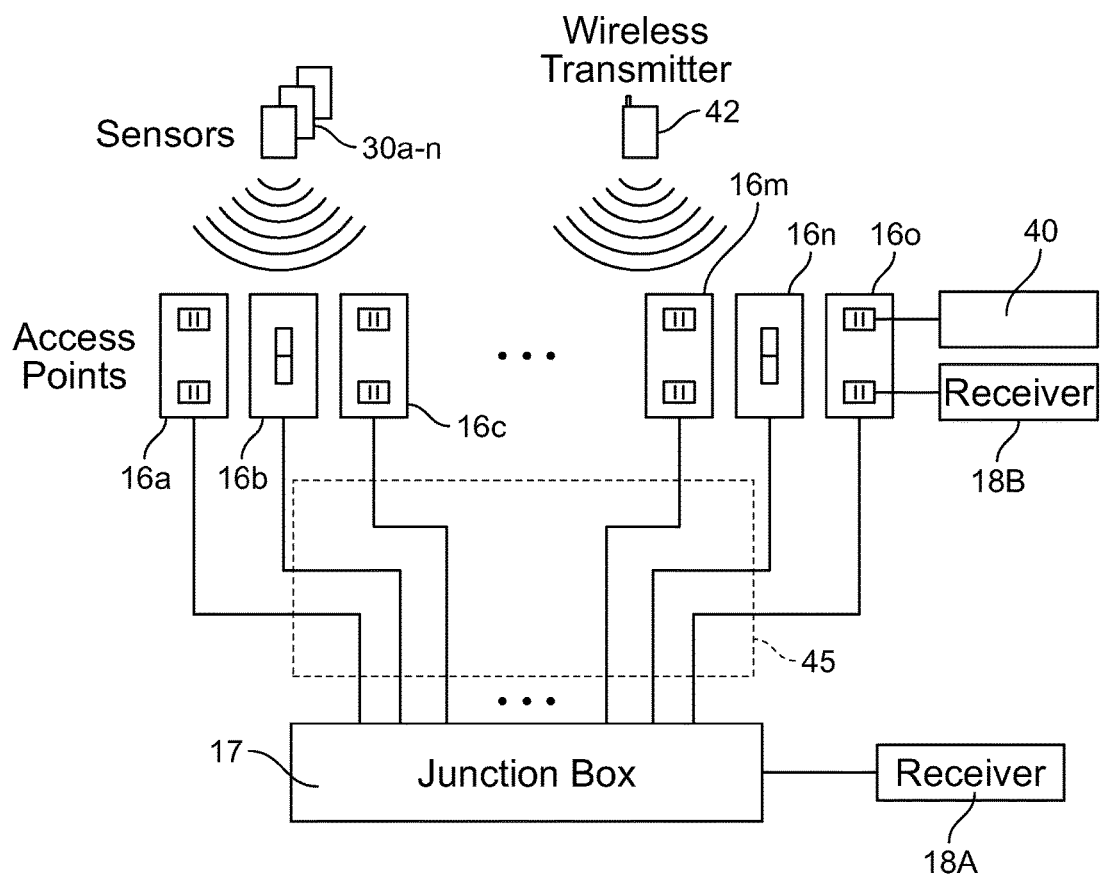
FIG. 12 illustrates conceptually the relationship of one or more sensors and wireless transmitting devices to multiple power line access points and one or more receivers.

FIG. 12 illustrates conceptually the relationship of one or more sensors 30a-n and wireless transmitting devices 40 to multiple power line access points 16a-o and one or more receivers 18a-b coupled the power line infrastructure in accordance with the disclosure. Specifically, a plurality of sensors 30a-n and which may have the structure and functionality similar to sensor 30 of FIG. 11 are disposed about a structure 15, often times in different rooms and different levels of the structure, if a multilevel structure is utilized. Each of sensors 30a-n or wireless transmitter device 42 are disposed within its power transmission range to one of access points 16a-o which, in turn, are coupled through the power line infrastructure, indicated conceptually by box 45 in phantom in FIG. 12, to any of receivers 18A-B or 40, which are beyond the range of receiving any electromagnetic transmissions from either sensors 30a-n or wireless transmitter device 42. Specifically, any of sensors 30a-n transmit their respective packets within their respective transmission power range. In some embodiments, the sensors 30a-n transmit data packets with an average current draw of less than 100 pA per 1.2V. In other embodiments, the sensors 30a-n transmit data packets with average current draw of less than 10 pA. Any access points 16a-o transmitting at such ranges allow the RF signals to incident upon the power line infrastructure. Receivers 18A-B which are electrically coupled to the power line infrastructure and receive the RF signals transduced by the power line infrastructure and may process and retransmit the received signals, as appropriate. A similar process occurs with a wireless transmitter 42 and its respective wireless receiver 40, as described herein. Note that sensors 30a-n and wireless transmitter 42 and their respective receivers may transmit within the same frequency band or range. As such, their respective antennas are configured accordingly.

Other types of receivers may be utilized for receivers 18A-B or 40, including, but not limited to, receivers specifically designed for receiving signals within the specific frequency band(s) transmitted by the sensors 30 within the system, as well as any type of consumer electronic wireless receiver.

Two types of antennas were tested with the embodiment of the sensor 30 shown in FIG. 11. One was a CB antenna measuring 43 cm tall and the other a custom-built loop antenna measuring 6.5 cm long×6.5 cm wide×2 cm tall. The transmit power necessary for sensor data reception is a function of the efficiency of the antenna. Clearly the loop antenna has a size advantage in terms of enabling a compact form factor for in-home sensors, however both of these antennas are relatively small compared to the 11.06 m wavelength at 27.12 MHz, meaning that both are reasonably inefficient at this frequency. The efficiency of the power line as a receiving antenna at 27 MHz largely makes up for this, but since it is desirable to operate the sensors at as low a power output as possible so as to increase their lifespan, a more efficient antenna will allow a lower transmit power. Thus, longevity of the sensor is a direct tradeoff with antenna size. A sensor built around the larger 43 cm CB antenna was able to transmit at a power level of about 2 dB less on average in order to be detected with the same SNR as with the loop antenna. As noted above, the use of 27.12 MHz is but one example, and in other embodiments other frequencies may be used. In some embodiments, the frequency may be between about 1 and about 50 MHz.

Infrastructure-based wireless sensors should be evaluated against existing wireless sensing technologies on two fronts—range and power efficiency. Communication range of wireless sensors is an important consideration since sensors communicate with a base-station to transmit readings. The primary model of enabling low power wireless sensor networks to date has been multi-hop mesh networking, wherein if a sensor cannot directly communicate with a base-station, it forwards its readings through other sensors within range until the packet reaches the base-station. Although this potentially allows sensors to operate at a lower transmit power than if they had to directly reach the base-station, it also requires other sensors to receive data and then re-transmit it. Interestingly, the Texas Instruments CC2420, a popular 2.4 GHz ZigBee-compliant RF transceiver used in the Sun Microsystems SunSPOTs and Crossbow MicaZ wireless sensors, uses more power in receive mode (19.7 mA) than in transmit mode (17.4 mA @ 0 dBm).

To make a direct comparison between the power line-based sensors and existing sensor network technology, the communication range of two SunSPOT wireless sensors was tested within the test home. One SunSPOT continually transmitted packets at a power of −25 dBm, while the other continually listened for packets and flashed an LED when it received them. Signal level of −25 dBm was chosen since a power line connected receiver was able to detect a 27 MHz transmitter at that power level throughout the house (in fact, −35 dBm was sufficient power to sense a transmitter within 60 cm of a power line when using a power line connected receiver anywhere in the home). The transmitting SunSPOT was left in a fixed location (to simulate a fixed wireless sensor) and walked around the test home with the receiving SunSPOT (to test possible locations for the sensor base-station). At −25 dBm, while the power line-based sensors were able to be detected at any room in the home by connecting a receiver to the outlet, the SunSPOTs could generally only communicate within the same room. The SunSPOTs' range was also tested whether it could be extended by coupling to the power line by placing both SunSPOTs near an outlet. This actually decreased their range. To give the SunSPOTs' whole-house coverage, their transmit power was increased to 0 dBm (1 mW). As noted above, the use of 27.12 MHz is but one example, and in other embodiments other frequencies may be used. In some embodiments, the frequency may be between about 1 and about 50 MHz.

Protocol Efficiency

Figure 13:
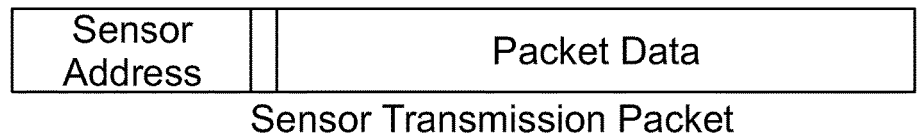
FIG. 13 illustrates conceptually one embodiment of a format of a transmission packet.

Besides utilizing the existing infrastructure to extend the range of the low-power sensors, an additional source of power efficiency is the low complexity of the data transmission protocol. As mentioned earlier, the power line-based sensors may be designed only to transmit sensor readings periodically and do not need to receive data or forward data for other sensors. This allows the data transmission protocol to be extremely simple. Instead of the 256 bits of overhead in every ZigBee packet, the disclosed protocol may be use, for example, only six bits of overhead (five bits for the sensor address and one stop bit), as illustrated in FIG. 13. Thus, although the disclosed sensor has a lower data transmission rate than Zigbee (62.5 kbps vs. 250 kbps), the time the transmitter must be active to transmit a 10 bit sensor reading is actually less for the disclosed power line-based sensor 30, thus requiring less energy.

A direct comparison metric for the two technologies is milliamp-hours per bit transmitted (mAh/bit) which may be calculated as shown in Equation 3:

$$\frac{Number\_of\_Bits}{bits/sec}(RadioPower)\frac{1\ hr}{3600\ sec} \quad (3)$$

This data was provided for the power line-based 27 MHz wireless sensors and for 2.4 GHz Zigbee sensors in Table 4 which shows two configurations for Zigbee: no mesh and mesh. No mesh is a more direct comparison with the disclosed technology since here only the power that a Zigbee-based sensor must use to transmit a 10-bit sensor reading with similar coverage to power line based sensing is counted. The mesh Zigbee configuration, however, considers that Zigbee may need to forward packets in a mesh network configuration from sensors not within direct communication range of the base station. These values account for a sensor that must receive a packet from one of the out-of-range sensors and then forward the packet on to the base station, in addition to sending one of its own packets with a sensor reading for each forwarded packet. These calculations show that the disclosed power line-based wireless sensors use just 2%-7% of the power that a Zigbee-based wireless sensor requires for similar coverage. In fact, the actual results are potentially better since this calculation does not account for the fact that on-off-keying uses no power when transmitting a zero and represents the power necessary to transmit 16 bits having a "1" value. Most transmissions will comprise a combination of "1"s and "0"s. Table 4 shows 27 MHz power line-based wireless sensing compared with 2.4 GHz Zigbee.

TABLE 4

|  | Power line | Zigbee (no mesh) | Zigbee (mesh) |
| --- | --- | --- | --- |
| Total bits for a 10-bit Sensor Reading | 16 | 272 | 544 |
| Bit Rate (kbps) | 62.5 | 250 | 250 |
| Transmit Current (mA) | 1.5 | 17.4 | 17.4 |
| Receive Current (mA) | — | — | 19.7 |
| mAh/bit | $1.07 \cdot 10^{-7}$ | $52.6 \cdot 10^{-7}$ | $164.7 \cdot 10^{-7}$ |
| % age of Power line-sensing | 100% | 4,930% | 15,442% |

At the current data rate of 62.5 kilobits per second, each sensor needs 0.03% of a second to transmit its data. When each sensor transmits a 16-bit packet once per second, this leads to a theoretical maximum of 3,906 sensors per home. The disclosed system currently utilizes what may be considered a uni-directional version of the ALOHA protocol for multiple access on the channel. Since sensors are not capable of receiving, the various sensors within a home transmit at different times so as not to interfere. This may be done reasonably well without synchronization when the number of sensors does not approach the theoretical maximum by having the sensors add a randomized delay each time to the one second interval between transmitting packets. Such randomized delay may be generated, for example, from a linear feedback shift register based pseudorandom sequence generator within the sensor which will not appreciably increase the cost of the apparatus.

Although the disclosed current data transmission protocol does not use encryption, the nature of the system has a basic level of physical security built-in. By utilizing extremely low transmit powers on the sensors, the reception range is greatly limited for anyone attempting to overhear the sensors from outside the home. Although, as with any wireless technology, these devices are susceptible to snooping with high-gain antennas, this is generally expensive and impractical as the operating frequency is reduced. The power line also has a natural security mechanism built-in in the form of transformers. Electric power is distributed at a higher voltage than is utilized in the home.

Transformers convert this higher voltage to the voltage carried on the home power line. Transformers work well for low frequency signals like the 50-60 Hz power signal, but their high inductance causes them not to pass higher frequency signals like 27 MHz. Since one transformer may typically serve just a few homes, they act as a natural barrier to the sensors' signals propagating too far along the power line and being sensed by neighbors from within their homes.

Extending the Range of a Wireless Keyboard (Example Use Case Study)

The capabilities of the power line as a receiver over greater distances, ultimately as a communications infrastructure to augment low-power wireless devices throughout the entire home are demonstrated herein. In this alternative embodiment, several experiments with a software radio and a standard wireless keyboard operating at 27 MHz were performed. By coupling a receiver to the power line, the keyboard's range could be extended from 1.5-2 meters line-of-sight to non-line-of sight distances of up to approximately 30 m away, encompassing most locations within a 3-story 4,000 square foot/371 square meter home, all while maintaining the full functionality of the keyboard. The use of 27 MHz is but one example, and in other embodiments other frequencies may be used. In some embodiments, the frequency may be between about 1 and about 50 MHz.

Figure 14:
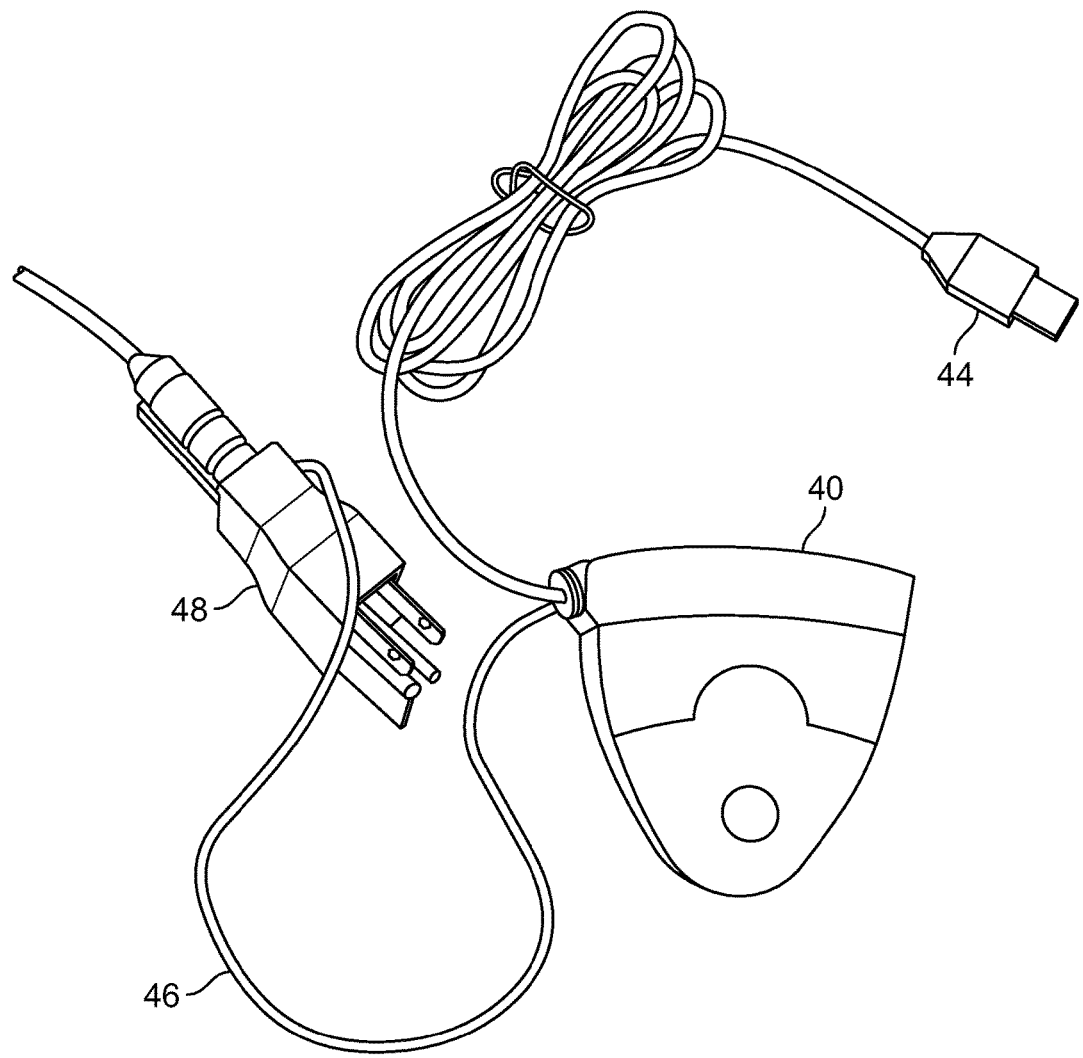
FIG. 14 illustrates a USB receiver for a wireless keyboard with its antenna coupled to the power line by wrapping it around a standard line cord.

A wireless keyboard 42 was used to test the capabilities of the home power line 45 as a receiving antenna since the keyboard in its standard configuration has a relatively short operational range of 1.5-2 meters. FIG. 14 illustrates a USB receiver for a wireless keyboard with its antenna 46 coupled to the power line by wrapping it around a standard line cord near the plug 48. A Logitech wireless keyboard and USB wireless receiver suitable for use with the system disclosed herein is commercially available from Logitech International S.A. Fremont, Calif. 94555. The wireless keyboard and receiver configured using a proprietary radio link operating at 27 MHz. The USB receiver 40 and antenna 46 are illustrated in FIG. 14. The wireless keyboard's receiver 40 connects to a computer via a standard USB connection.

The first experiments were conducted using a Universal Software Radio Peripheral (USRP) as the receiver. The USRP was capacitively coupled to the home power line at the basement electrical distribution panel by mounting an antenna inside of the panel door. It was thought that the distribution panel would be the optimal sensing location since all circuits in the house originate there. Thus, if the power line acts as a conduit for RF energy it picks up from the environment, it should channel those signals back to the distribution panel.

To sense the keyboard's signal, the USRP was tuned to 27 MHz and the FFT of the radio spectrum in that region observed. As keys were pressed, a spike at 27.146 MHz could be seen. The received signal strength of the keyboard using the power line as a receiving antenna was examined at twenty four locations spread throughout all floors and rooms of the test home. Of these twenty four, the keyboard's signal was visible at 20 locations. Conversely, without coupling the USRP's antenna to the power line at the distribution box, the keyboard could not be sensed at any of these locations.

While this method provided proof that the keyboard's signal could be received almost anywhere within the home using the power line as a receiving antenna, the question remained as to whether the signal-to-noise ratio (SNR) was great enough to decode the keyboard's signal accurately. While demodulation could also be performed with the USRP and appropriate software, the keyboard's modulation scheme was unknown and it was impractical to extend the range of the keyboard using an expensive piece of sensitive radio equipment. The functionality of the keyboard's own receiver was tested when coupled to the power line. To couple the keyboard's receiver to the power line, an approximately 50 cm wire 46 was soldered to the antenna input location on its board. The other end of this wire was coiled around a standard electrical device cord plugged into a wall socket. This setup provides capacitive coupling to the power line similar to the coupling box 20 apparatus and method disclosed herein, while allowing the keyboard receiver 40 to be located in a more realistic setting away from the main distribution box and near the computer it is intended to operate.

In this scenario, "sensing" the keyboard was defined as the appropriate letters from the pressed keys appearing on screen. When testing the same twenty four locations within the test home with this receiver, although the keyboard itself could not be sensed at all the chosen locations, when moved in close proximity (within approximately fifty cm) to a power outlet, it could be successfully sensed at even the far end of the home. Thus, coupling of the keyboard's signal through the power lines extends the operational range of this keyboard from about two meters to anywhere with a power outlet in close proximity in the home. Tests with the USRP demonstrated that the keyboard's signal may in fact be sensed at those locations away from a power outlet where the keyboard's receiver failed to work. Therefore, any of numerous commercially available, inexpensive RF amplifiers may be employed to boost the signal coupled from the power line sufficiently for the keyboard receiver to accurately demodulate it in a manner understood by those reasonably skilled in the arts.

Power Lines as Antennas

Antennas are carefully designed for use at a specific frequency or range of frequencies. The dipole is a common type of antenna that is usually designed to be one half or one quarter the size of the wavelength of the frequency it will be used at. The power line was never intended to be used as an antenna, however, and so its radiation pattern at various frequencies will differ greatly from standard antennas. Some of the RF devices and services that have been successfully received using the power line as an antenna are shown, along with their associated frequencies and wavelengths, in Table 1. Note that half the wavelength of the wireless keyboard's signal is approximately five meters. There are likely many straight stretches of power wiring in the walls of a home that extend distances on the order of 5 meters. This may account for the success at using the power line to sense this low-power device.

To further validate the validity of the apparatus, systems and techniques disclosed herein, a validation of previous work on line cord antennas to aid in the reception of high-powered TV and radio broadcasts from outside the home was also performed. The signal strength of ten different TV and FM radio stations was measured by coupling the USRP to the power line. The received signal strength (RSS) for various over-the air broadcast television and FM radio stations was measured with a standard VHF television antenna, no antenna, and the power line as antenna with the receiver directly coupled to the power line. The power line measurements were compared to measurements taken with a standard TV VHF antenna (which also covers the FM radio band) and measurements taken without an antenna as a reference. Although the VHF antenna produces a higher signal strength at all ten stations tested, the power line antenna performs reasonably well by comparison. Various RF devices and services and their associated frequencies and wavelengths are illustrated in Table 5 below.

TABLE 5

| Device/Service | Frequency | Wavelength |
|---|---|---|
| AM Radio | 520 kHz-1610 kHz | 932 m-288 m |
| Wireless keyboard | 27 MHz | 11.11 m |
| FM Radio | 88 MHz-108 MHz | 2.78 m-3.41 m |
| NTSC Analog Television | 54 MHz-806 MHz | 5.56 m-0.372 m |

One application of the in-home power line as a receiving antenna is for home wireless sensor networks. Current wireless sensor networks often use mesh networking as a means of extending the communication range of individual nodes. In a mesh network, wireless sensor nodes route packets for other nodes back to a central sink where all data from the sensor network is received and processed. In a mesh network configuration, sensor nodes are forced to constantly listen for and receive packets from neighboring nodes to forward them along.

The MicaZ is a popular wireless sensor network platform, commercially available from Crossbow Technologies, Milpitas, Calif. 95035, that operates at 2.4 GHz. The data sheet for the MicaZ reports that its RF transceiver draws between 11 and 17.4 mA when transmitting. Interestingly, the data sheet also reports that the RF transceiver draws more power when receiving −19.7 mA. Higher current draw for receiving is an important consideration when placing sensor nodes in a mesh configuration, as a mesh requires nodes to be in the high power receiving state often, as packets to be forwarded along arrive from neighboring nodes.

In contrast to the MicaZ, a current draw of 5 mA was measured when transmitting for the wireless keyboard utilized in the experiments. The keyboard operates on 3 V, and was designed to use two AA batteries. A typical alkaline AA battery has a capacity of 3,000 mAh, meaning that the keyboard could transmit continuously for 25 days. Wireless sensors typically only transmit periodically, however, so its life would in practice be significantly longer. In contrast, the MicaZ, even if only transmitting, and not receiving as required for a mesh network configuration, has a lifespan of 7 to 11 days when continuously transmitting.

Thus the power line as a potential conduit for RF signals from wireless sensor nodes within the home is disclosed herein. Rather than placing sensor nodes in a wireless mesh configuration, each node may simply transmit its own packets without need to forward along packets from neighboring nodes. The RF signal from each node will couple to the power line through nearby in-wall wiring and outlets. The signal may then be received at the sensor network sink, whose receiver is coupled to the power line via a line cord as illustrated in FIG. 14. This method eliminates the power expenditures necessary to receive and forward along packets from other nodes. Additionally, given that the transmitter of the tested wireless keyboard has a lower power draw than the MicaZ transceiver, yet could still be detected throughout the home, there is potential to use lower power transmitters than would otherwise have been possible with traditional antennas and over-the-air reception.

It is to be understood that the above-described embodiments are merely illustrative of some of the many specific embodiments that represent applications of the principles discussed above. Although many examples above disclose utilizing a power line in particular, in various embodiments other infrastructure components may be used instead or in addition to the power line, such as plumbing, metallic beams, studs, panels, or other elongated structure that may support propagation of a signal. In some other embodiments, the infrastructure may be part of a vehicle, bridge, or other such object, and the technology disclosed herein is not limited to buildings such as a house or office structure. Accordingly, element 45, described above with reference to FIG. 12 in the context of a power line infrastructure, may in other embodiments represent any of the conductive devices, elements, objects, and structures described above.

From the foregoing, it will be appreciated that specific embodiments have been described herein for purposes of illustration, but that various modifications may be made without deviating from the technology. For example, the shape of the housing for both the water sensor and the hub may vary. Moreover, the various disclosed sensors may operate over various different frequencies depending on the application, the infrastructure, and other parameters. Certain aspects described in the context of particular embodiments may be combined or eliminated in other embodiments. For example, in some embodiments the water sensor may omit a wireless transmitter or an antenna. Further, while advantages associated with certain embodiments of the disclosed technology have been described in the context of those embodiments, other embodiments may also exhibit such advantages, and not all embodiments need necessarily exhibit such advantages to fall within the scope of the technology. Accordingly, the disclosure may encompass other embodiments not expressly shown or described herein.

What is claimed is:

1. A water sensor, comprising:
   a housing;
   a water sensing circuit enclosed within the housing, the water sensing circuit comprising a comparator configured to compare an input signal with a reference signal and generate an output signal indicative of a comparison between the input signal and the reference signal;
   a first contact disposed on an external surface of the housing, the first contact providing a first sensing surface at a first location on the external surface of the housing; and
   a second contact disposed on the external surface of the housing, the second contact providing a second sensing surface at a second location on the external surface of the housing;
   wherein the first contact is coupled to the reference signal and the second contact is coupled to the comparator;
   wherein the second sensing surface of the second contact is configured to receive the reference signal from the first sensing surface of the first contact via an impedance induced by moisture between the first and second locations on the external surface of the housing and provide the received reference signal to the water sensing circuit;
   wherein the water sensing circuit is further configured to generate, from the received reference signal, the input signal such that the input signal is proportional to the impedance induced by moisture between the first and second locations on the external surface of the housing; and
   wherein the water sensing circuit further comprises a logic gate configured to receive the reference signal and the output signal of the comparator and generate a water level signal that is indicative of a level of wetness between the first and second locations on the external surface of the housing.

2. The water sensor of claim 1, wherein the reference signal comprises a time varying voltage.

3. The water sensor of claim 2, wherein the time varying voltage comprises a square wave, a sine wave, or a triangle wave.

4. The water sensor of claim 3, wherein the time varying voltage has a frequency between 10 Hz and 100 kHz.

5. The water sensor of claim 1, wherein the first and second contacts comprise metallic contacts.

6. The water sensor of claim 1, wherein the logic gate is configured to generate the water level signal such that the water level signal is further indicative of a degree of impurity of the water.

7. The water sensor of claim 1, wherein the logic gate comprises an exclusive-OR (XOR) gate comprising first and second inputs, wherein said first input is coupled to an output of the comparator to receive the output signal, and wherein said second input is coupled to the reference signal,
   wherein the XOR gate outputs the water level signal having a first state in response to the output signal from the comparator and the reference signal having a same state, and wherein the XOR gate outputs the water level signal having a second state in response to the output signal from the comparator and the reference signal not having the same state.

8. The water sensor of claim 7, wherein the XOR gate varies a duty cycle of the water level signal as wetness varies between the first and second locations on the external surface of the housing.

9. The water sensor of claim 1, further comprising a wireless transmission mechanism configured to transmit signals, based on the water level signal, that are indicative of the level of wetness between the first and second locations on the external surface of the housing.

10. The water sensor of claim 1, further comprising a wired transmission mechanism configured to transmit signals, based on the water level signal, that are indicative of the level of wetness between the first and second locations on the external surface of the housing.

11. The water sensor of claim 1, further comprising a display on the external surface of the housing, wherein the display is configured to display indicia based on the water level signal.

12. The water sensor of claim 1, wherein at least one contact of the first and second contacts comprises a screw.

13. A water sensor, comprising:
a housing having an external surface;
a comparator, within the housing, configured to compare an input signal with a reference signal and generate an output signal indicative of a comparison between the input signal and the reference signal;
a first contact disposed on the external surface of the housing, the first contact comprising a first sensing surface at a first location on the external surface of the housing, wherein the first contact is coupled to the reference signal;
a second contact disposed on the external surface of the housing, the second contact comprising a second sensing surface at a second location on the external surface of the housing, wherein the second contact is coupled to the comparator, the second contact configured to generate the input signal, based on propagation of the reference signal, across an impedance induced by moisture between the first and second locations on the external surface of the housing; and
an exclusive-OR (XOR) gate comprising first and second inputs, wherein said first input is coupled to an output of the comparator to receive the output signal of the comparator, said second input is coupled to the reference signal, and the XOR gate is configured to output a wetness level signal having a duty cycle that varies depending on a level of wetness between the first and second locations on the external surface of the housing; and
a wireless transmitter configured to transmit signals, based on the wetness level signal, that are indicative of the level of wetness between the first and second locations on the external surface of the housing.

14. The water sensor of claim 13, wherein at least one contact of the first and second contacts comprises a screw.

15. A method of monitoring a wetness level, comprising:
applying a reference signal having a time varying voltage to a first contact disposed at a first location on a housing of a water sensor;
generating, based on the reference signal received by a second contact disposed at a second location on the housing of the water sensor that is spaced apart from the first location on the housing, an input signal that is proportional to an impedance developed due to moisture between the first and second locations on the housing;
generating an output signal indicative of a comparison between the input signal and the reference signal; and
generating, based on the output signal and the reference signal, a wetness level signal that has a duty cycle that varies depending on a level of wetness between the first and second locations on the housing.

16. The method of claim 15, wherein said generating the reference signal comprises generating a square wave reference signal, a sine wave reference signal, or a triangle wave reference signal.

17. The method of claim 15, wherein said generating the reference signal comprises varying voltage at a frequency between 10 Hz and 100 kHz.

18. The method of claim 15, further comprising wirelessly transmitting signals, based on the wetness level signal, that are indicative of the level of wetness between the first and second locations on the housing.

* * * * *